(12) United States Patent
Calley

(10) Patent No.: US 7,863,797 B2
(45) Date of Patent: Jan. 4, 2011

(54) ELECTRICAL DEVICES USING ELECTROMAGNETIC ROTORS

(75) Inventor: David G. Calley, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 0 days.

(21) Appl. No.: 12/847,991

(22) Filed: Jul. 30, 2010

(65) Prior Publication Data

US 2010/0295410 A1 Nov. 25, 2010

Related U.S. Application Data

(63) Continuation of application No. 12/149,931, filed on May 9, 2008, now Pat. No. 7,800,275.

(60) Provisional application No. 60/924,328, filed on May 9, 2007, provisional application No. 61/064,161, filed on Feb. 20, 2008, provisional application No. 61/064,162, filed on Feb. 20, 2008.

(51) Int. Cl.
 *H02K 1/12* (2006.01)
 *H02K 1/22* (2006.01)
(52) U.S. Cl. ...................... 310/263; 310/257
(58) Field of Classification Search ............ 310/257, 310/263
 See application file for complete search history.

(56) References Cited

U.S. PATENT DOCUMENTS

| | | |
|---|---|---|
| 1,361,136 A | 12/1920 | Burke |
| 2,078,668 A | 4/1937 | Kilgore |
| 3,403,273 A | 9/1968 | Hiroshi |
| 3,437,854 A | 4/1969 | Oiso |
| 3,558,941 A | 1/1971 | Visconti Brebbia et al. |

(Continued)

FOREIGN PATENT DOCUMENTS

DE  1513856  4/1969

(Continued)

OTHER PUBLICATIONS

Notice of Allowance dated Mar. 29, 2005 for U.S. Appl. No. 10/721,765.

(Continued)

*Primary Examiner*—Quyen Leung
*Assistant Examiner*—Leda Pham
(74) *Attorney, Agent, or Firm*—Snell & Wilmer L.L.P.

(57) ABSTRACT

An electrical machine comprises a rotor assembly comprising a first set and a second set of rotor extensions, and a stator assembly comprising a first set and a second set of stator extensions. Rotating the rotor assembly about an axis alternates the rotor assembly between a first position and a second position. In the first position, each of the first set of rotor extensions transfers flux to one of the first set of stator extensions, and each of the second set of rotor extensions transfers flux to one of the second set of stator extensions. In the second position, each of the first set of rotor extensions transfers flux to one of the second set of stator extensions, and each of the second set of rotor extensions transfers flux to one of the first set of stator extensions. The electrical machine is at least one of a transverse flux machine or a commutated flux machine.

19 Claims, 20 Drawing Sheets

U.S. PATENT DOCUMENTS

| | | |
|---|---|---|
| 3,700,942 A | 10/1972 | Alth |
| 3,710,158 A | 1/1973 | Bachle et al. |
| 3,774,059 A | 11/1973 | Cox |
| 4,021,691 A | 5/1977 | Dukshtau et al. |
| 4,114,057 A | 9/1978 | Esters |
| 4,206,374 A | 6/1980 | Goddijn |
| 4,237,396 A | 12/1980 | Blenkinsop et al. |
| 4,255,684 A | 3/1981 | Mischler et al. |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,605,874 A | 8/1986 | Whiteley |
| 4,611,139 A | 9/1986 | Godkin et al. |
| 4,620,752 A | 11/1986 | Fremerey et al. |
| 4,658,166 A | 4/1987 | Oudet |
| 4,794,286 A | 12/1988 | Taenzer |
| 4,797,602 A | 1/1989 | West |
| 4,835,840 A | 6/1989 | Stokes |
| 4,850,100 A | 7/1989 | Stokes |
| 4,900,965 A | 2/1990 | Fisher |
| 4,959,577 A | 9/1990 | Radomski |
| 5,038,066 A | 8/1991 | Pawlak et al. |
| 5,051,641 A | 9/1991 | Weh |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd |
| 5,208,503 A | 5/1993 | Hisey |
| 5,212,419 A | 5/1993 | Fisher et al. |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,382,859 A | 1/1995 | Huang et al. |
| 5,386,166 A | 1/1995 | Reimer et al. |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,712,521 A | 1/1998 | Detela |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,886,449 A | 3/1999 | Mitcham |
| 5,889,348 A | 3/1999 | Muhlberger et al. |
| 5,894,183 A | 4/1999 | Borchert |
| 5,925,965 A | 7/1999 | Li et al. |
| 5,942,828 A | 8/1999 | Hill |
| 5,973,436 A | 10/1999 | Mitcham |
| 5,994,802 A | 11/1999 | Shichijyo et al. |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,126 A | 8/2000 | Takura |
| 6,121,712 A | 9/2000 | Sakamoto |
| 6,133,655 A | 10/2000 | Suzuki et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,177,748 B1 | 1/2001 | Katcher et al. |
| 6,181,035 B1 | 1/2001 | Acquaviva |
| 6,194,799 B1 | 2/2001 | Miekka |
| 6,229,238 B1 | 5/2001 | Graef |
| 6,232,693 B1 | 5/2001 | Gierer et al. |
| 6,236,131 B1 | 5/2001 | Schafer |
| 6,300,702 B1 | 10/2001 | Jack et al. |
| 6,365,999 B1 | 4/2002 | Muhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,545,382 B1 | 4/2003 | Bennett |
| 6,603,060 B1 | 8/2003 | Ohashi et al. |
| 6,603,237 B1 | 8/2003 | Caamano |
| 6,657,329 B2 | 12/2003 | Kastinger et al. |
| 6,664,704 B2 * | 12/2003 | Calley ........................ 310/257 |
| 6,707,208 B2 | 3/2004 | Durham et al. |
| 6,717,297 B2 | 4/2004 | Sadarangani et al. |
| 6,774,512 B2 | 8/2004 | Takagi et al. |
| 6,794,791 B2 | 9/2004 | Ben Ahmed et al. |
| 6,815,863 B1 | 11/2004 | Jack et al. |
| 6,849,985 B2 | 2/2005 | Jack et al. |
| 6,853,112 B2 | 2/2005 | Nakamura et al. |
| 6,867,530 B2 | 3/2005 | Gamm et al. |
| 6,879,080 B2 | 4/2005 | Caamano |
| 6,885,129 B1 | 4/2005 | Oohashi et al. |
| 6,924,579 B2 | 8/2005 | Calley |
| 6,940,197 B2 | 9/2005 | Fujita et al. |
| 6,949,855 B2 | 9/2005 | Dubois et al. |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 | 4/2006 | Dommsch et al. |
| 7,030,534 B2 | 4/2006 | Caamano |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,230,361 B2 | 6/2007 | Hirzel |
| 7,245,055 B2 | 7/2007 | Jack |
| 7,250,704 B1 | 7/2007 | Sortore et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,592,735 B2 | 9/2009 | Hamada |
| 7,602,095 B2 | 10/2009 | Kusase |
| 7,638,919 B2 * | 12/2009 | Pulnikov et al. ............ 310/257 |
| 2001/0001528 A1 | 5/2001 | Ragaly |
| 2001/0030479 A1 | 10/2001 | Mohler |
| 2001/0030486 A1 | 10/2001 | Pijanowski |
| 2002/0070627 A1 | 6/2002 | Ward et al. |
| 2002/0135242 A1 | 9/2002 | Kawai |
| 2003/0122439 A1 | 7/2003 | Horst |
| 2003/0122440 A1 | 7/2003 | Horst |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0191519 A1 | 9/2004 | Kejzelman et al. |
| 2004/0212267 A1 | 10/2004 | Jack et al. |
| 2004/0232799 A1 | 11/2004 | Chen et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |

| | | | |
|---|---|---|---|
| 2005/0012427 A1 | 1/2005 | Seki et al. | |
| 2005/0062348 A1 | 3/2005 | Ohnishi et al. | |
| 2005/0121983 A1 | 6/2005 | Ehrhart | |
| 2005/0139038 A1 | 6/2005 | Kjellen et al. | |
| 2005/0156479 A1 | 7/2005 | Fujita et al. | |
| 2005/0242679 A1 | 11/2005 | Walter et al. | |
| 2006/0012259 A1 | 1/2006 | Kerlin | |
| 2006/0012263 A1 | 1/2006 | Smith et al. | |
| 2006/0082237 A1 | 4/2006 | Kerlin | |
| 2006/0091755 A1 | 5/2006 | Carlisle et al. | |
| 2006/0131974 A1 | 6/2006 | Sadarangani et al. | |
| 2006/0131986 A1 | 6/2006 | Hsu et al. | |
| 2006/0192453 A1 | 8/2006 | Gieras et al. | |
| 2006/0220477 A1 | 10/2006 | Okumoto et al. | |
| 2006/0261688 A1 | 11/2006 | Akita et al. | |
| 2007/0013253 A1 | 1/2007 | Dubois et al. | |
| 2007/0046137 A1 | 3/2007 | Ooiwa | |
| 2007/0046139 A1 | 3/2007 | Ishizuka | |
| 2007/0075605 A1 | 4/2007 | Enomoto et al. | |
| 2007/0138900 A1 | 6/2007 | Imai et al. | |
| 2007/0152528 A1 | 7/2007 | Kang et al. | |
| 2007/0176505 A1 | 8/2007 | Trzynadlowski et al. | |
| 2008/0007126 A1* | 1/2008 | Popov et al. | 310/49 R |
| 2008/0169776 A1 | 7/2008 | Acker | |
| 2008/0211326 A1 | 9/2008 | Kang et al. | |
| 2008/0265707 A1 | 10/2008 | Bradfield | |
| 2008/0309188 A1 | 12/2008 | Calley | |
| 2008/0315700 A1 | 12/2008 | Ishikawa et al. | |
| 2009/0042051 A1 | 2/2009 | Skarman et al. | |
| 2009/0152489 A1 | 6/2009 | Kjellen et al. | |
| 2009/0243406 A1 | 10/2009 | Jack et al. | |
| 2010/0015432 A1 | 1/2010 | Bergmark et al. | |
| 2010/0038580 A1 | 2/2010 | Ye et al. | |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 5/1998 |
| DE | 19634949 | 5/1998 |
| DE | 102006026719 | 6/2006 |
| EP | 0544200 | 11/1992 |
| EP | 0707374 | 4/1996 |
| EP | 0718959 | 6/1996 |
| EP | 0998010 | 3/2000 |
| EP | 1063754 | 12/2000 |
| EP | 1117168 | 7/2001 |
| EP | 1227566 | 7/2002 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR/WO dated Aug. 15, 2008 for International Application No. PCT/US2008/063301.
IPRP dated Nov. 10, 2009 for International Application No. PCT/US2008/063301.
ISR/WO dated Aug. 20, 2008 for International Application No. PCT/US2008/063236.
IPRP dated Nov. 17, 2009 for International Application No. PCT/US2008/063236.
ISR/WO dated Oct. 24, 2008 for International Application No. PCT/US2008/063336.
IPRP dated Nov. 17, 2009 for International Application No. PCT/US2008/063336.
ISR/WO dated Aug. 15, 2008 for International Application No. PCT/US2008/063287.
IPRP dated Nov. 10, 2009 for International Application No. PCT/US2008/063287.
ISR/WO dated Nov. 10, 2009 for International Application No. PCT/US2008/063268.
IPRP dated Nov. 10, 2009 for International Application No. PCT/US2008/063268.
Technical Project Presentation—Development of a High-Performance Generator for Wind Turbines—by Andrzej M. Trzynadlowski, PhD, University of Nevada, Reno, FIEEE, Aug. 2007.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method": J. Elect. Electron. Eng., Australia, vol. 22, No. 1, pp. 69-75, 2002.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University, Jun. 2004.
"Permanent Magnet Assisted Synchronous Reluctance Motor Design and Performance Improvement",—A Dissertation by Peyman Niazi, Texas A&M University, Dec. 2005.
"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.
"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.
"Analytical Interpretation and Quantification of Rotational Losses in Stator Cores of Induction Motors",—IEEE Transactions on Magnetics, vol. 43, No. 10, Oct. 2007, retrieved Jan. 8, 2010.
Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.
Dubois, Maxine R. et al.; "Clawpole Transverse-Flux Machine with Hybrid Stator"; pp. 1-6, Jul. 15, 2006.
Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.
Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.
Husband, S.M. et al.; "The Rolls-Royce Transverse Flux Motor Development"; Electric Machines and Drives Conference, vol. 3, pp. 1435-1440, IEEE, 2003.
Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2.

Fundamental Modeling for Optimal Design of Transverse Flux Motors—Genevieve Patterson et al., University of Tokyo, 2008.

www.higenmotor.com/eng/aboutus/about06 read.asp?id=notice &no=87 dated Jan. 15, 2010.

Lyng Eltorque QT 800—2.0 User Manual, version 1.0—dated Jul. 3, 2007.

Motors: Emerging Concepts (Apr. 2007) by George Holling.

www.iem.rwth-aachen.de/index.pl/new materials and machines?makePrintable=1.

Raser Technologies Company Brochure, 2005.

Response to Office Action filed Jan. 15, 2010 for Japanese Patent Application No. JPPA-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

* cited by examiner

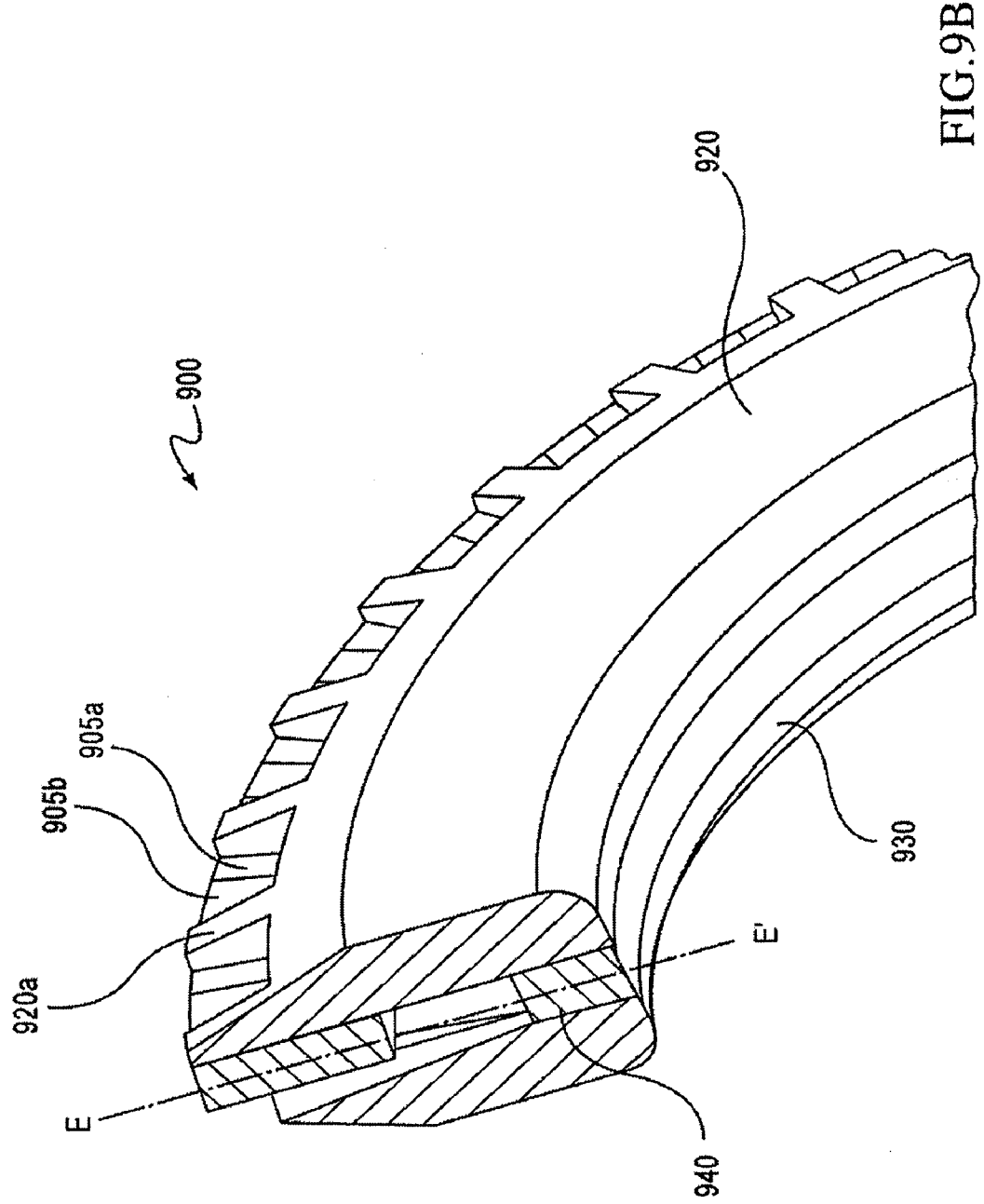

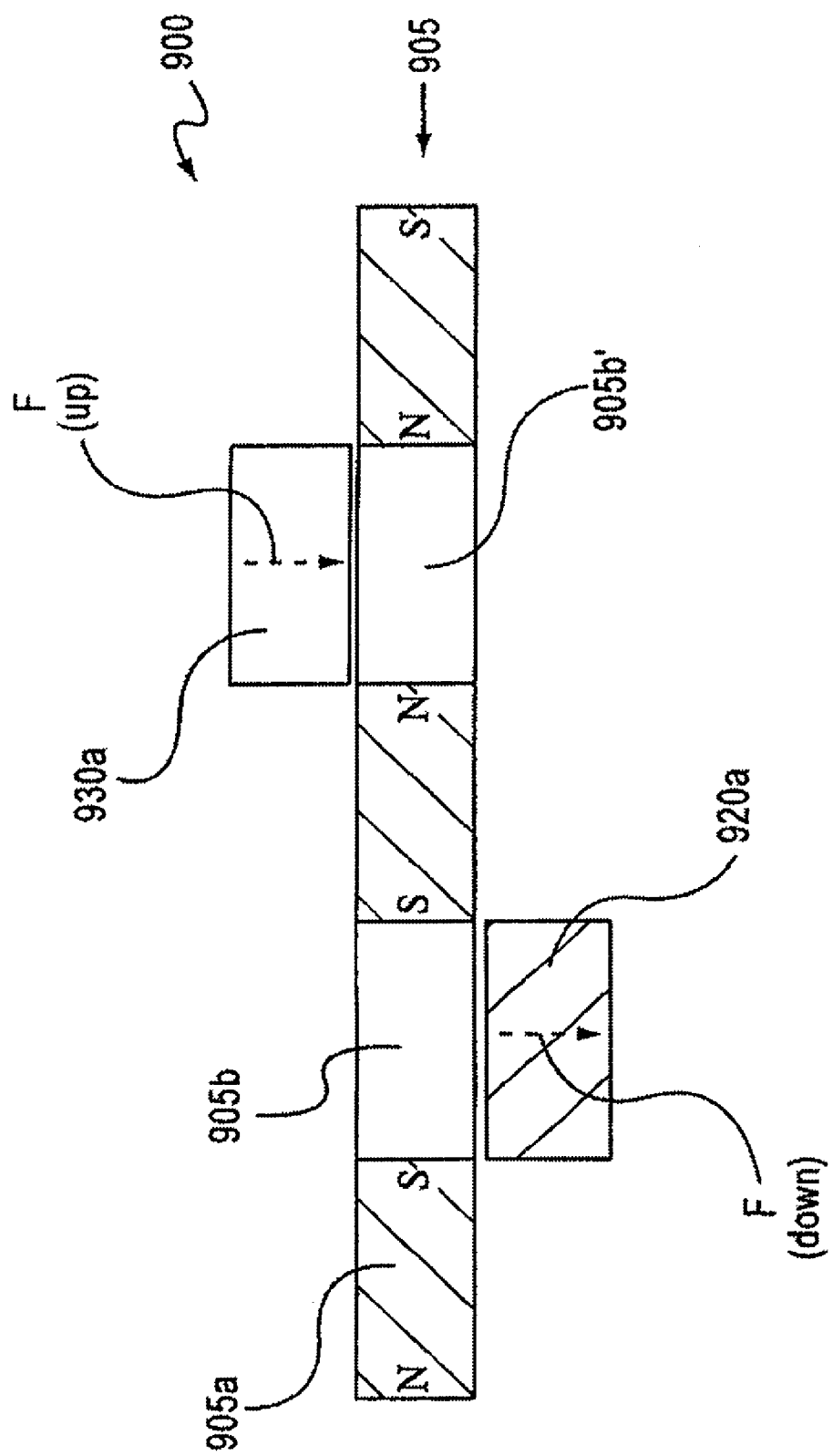

ELECTRICAL DEVICES USING ELECTROMAGNETIC ROTORS

CROSS REFERENCE TO RELATED APPLICATIONS

This application is a continuation of U.S. Ser. No. 12/149,931 filed on May 9, 2008 and entitled "ELECTRICAL DEVICES USING ELECTROMAGNETIC ROTORS". U.S. Ser. No. 12/149,931 is a non-provisional of U.S. Provisional No. 60/924,328 filed on May. 9, 2007 and entitled "ELECTRICAL OUTPUT GENERATING DEVICES AND DRIVEN ELECTRICAL DEVICES, AND METHODS OF MAKING AND USING THE SAME". U.S. Ser. No. 12/149,931 is also a non-provisional of U.S. Provisional No. 61/064,161 filed on Feb. 20, 2008 and entitled "LAMINATE ROTOR OR STATOR ELEMENTS FOR ELECTRICAL OUTPUT GENERATING DEVICES AND DRIVEN ELECTRICAL DEVICES, AND METHODS OF MAKING AND USING SUCH ELEMENTS AND DEVICES". U.S. Ser. No. 12/149,931 is also a non-provisional of U.S. Provisional No. 61/064,162 filed on Feb. 20, 2008 and entitled "ELECTRICAL OUTPUT GENERATING DEVICES AND DRIVEN ELECTRICAL DEVICES, AND METHODS OF MAKING AND USING THE SAME". The entire contents of all of the foregoing applications are hereby incorporated by reference.

TECHNICAL FIELD

Aspects of the present invention relate to the field of alternator or other electrical output generating devices and to electric motors and other electrically driven devices, and in particular to electrical output generating devices and electrically driven devices, and methods of making and use thereof, that, among other things, improve efficiency of operation, provide higher torque density, and reduce costs and complexity of manufacture, while allowing greater flexibility in operation over related art devices.

BACKGROUND

Related art multipole windings for alternators and electric motors typically require complex winding machines and often complex geometry windings in order to meet size and power needs. This problem is generally higher with greater numbers of poles used. Greater numbers of poles have certain advantages, such as allowing higher voltage per turn, providing higher torque density, and producing voltage at a higher frequency.

There is an unmet need in the art for electrical output generating devices and electrically driven devices, and methods of manufacturing and use thereof, that improve efficiency of operation and reduce costs and complexity of manufacture, while allowing greater flexibility in operation over prior art devices.

SUMMARY

In an exemplary embodiment, an electrical machine comprises a rotor assembly comprising a first set and a second set of rotor extensions, and a stator assembly comprising a first set and a second set of stator extensions. Rotating the rotor assembly about an axis alternates the rotor assembly between a first position and a second position. In the first position, each of the first set of rotor extensions transfers flux to one of the first set of stator extensions, and each of the second set of rotor extensions transfers flux to one of the second set of stator extensions. In the second position, each of the first set of rotor extensions transfers flux to one of the second set of stator extensions, and each of the second set of rotor extensions transfers flux to one of the first set of stator extensions. The electrical machine is at least one of a transverse flux machine or a commutated flux machine.

In another exemplary embodiment, a method of generating a current in an electrical machine comprises rotating a rotor assembly about an axis to alternate the rotor assembly between a first position and a second position with respect to a stator assembly. The rotor assembly comprises a first set and a second set of rotor extensions, and the stator assembly comprises a first set and a second set of stator extensions. In the first position, each of the first set of rotor extensions transfers flux to one of the first set of stator extensions, and each of the second set of rotor extensions transfers flux to one of the second set of stator extensions. In the second position, each of the first set of rotor extensions transfers flux to one of the second set of stator extensions, and each of the second set of rotor extensions transfers flux to one of the first set of stator extensions. The electrical machine is at least one of a transverse flux machine or a commutated flux machine.

BRIEF DESCRIPTION OF THE DRAWINGS

With reference to the following description, appended claims, and accompanying drawings:

FIGS. 9A and 9B illustrate views of an exemplary flux concentrating multiple pole rotor electrical output device or electrically driven device, in accordance with aspects of the present invention;

FIG. 9D shows a representative view of the electrical output device or electrically driven device of FIGS. 9A-9B from a view perpendicular to the direction E-E' shown in FIG. 9B;

DETAILED DESCRIPTION

Aspects of the present invention and implementations thereof are not limited to the specific components or assembly procedures disclosed herein. Many additional components and assembly procedures known in the art consistent with the intended electrical output generating devices, electrically driven devices, and/or assembly procedures for electrical output generating devices and/or electrically driven devices will become apparent for use with particular variations and implementations discussed herein. Accordingly, for example, although particular electrical output generating devices and/or electrically driven devices are disclosed, such electrical output generating devices and/or electrically driven devices and implementing components may comprise any shape, size, style, type, model, version, measurement, concentration, material, quantity, and/or the like usable for such electrical output generating devices and/or electrically driven devices and implementing components, consistent with the intended operation of electrical output generating devices and/or electrically driven devices.

Description of exemplary variations and implementations of electrical output generating devices and/or electrically driven devices in accordance with aspects of the present invention will now be made with reference to the appended drawings.

Devices Using Flux Conducting Material Stator

FIGS. 1-3B present a first exemplary variation of components of an electrical output device or electrically driven device and a method of operation thereof, in accordance with aspects of the present invention.

Figure 1:
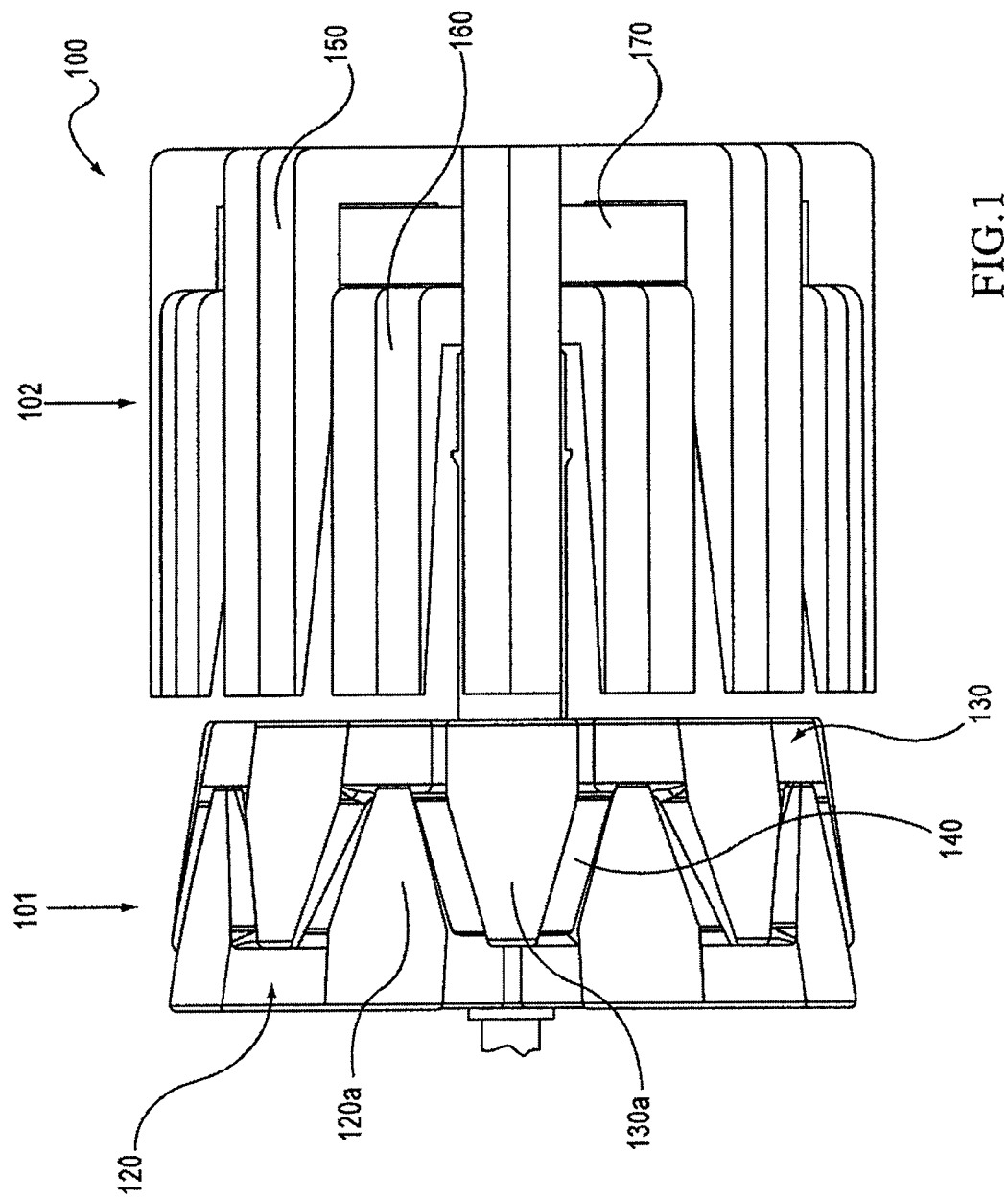
FIG. 1 shows the internal components for a first exemplary electrical output device or electrically driven device in a partially disassembled view, in accordance with aspects of the present invention.

FIG. 1 shows the internal components 100 for a first exemplary single phase alternator (or, for example, a generator or other electrical output device; herein referred to throughout, interchangeably and collectively, as a "device," "alternator," or "electric motor") in a partially disassembled view, in accordance with aspects of the present invention. Such a device is usable in many driven rotation applications to produce electrical output, such as for use with an automobile engine.

As shown in FIG. 1, in this first exemplary variation, a first, rotating portion 101 of the internal components 100 is similar in design and operation to a conventional Lundell rotor or Claw Pole rotor, used, for example, in many typical related art automobile alternators.

The rotating portion 101 includes first magnetic polar portions (e.g., north magnetic poles) 120 and a second magnetic polar portions (e.g., south magnetic poles) 130. The first and second magnetic polar portions 120, 130 encompass an internal coil portion 140, such as a coiled wire. The internal coil portion 140 receives an energizing current (e.g., a fixed current, such as a direct current or DC). As a result of the energizing current in the coil portion 140, a flux is produced through the center of the coil portion 140 and about the outside of the coil portion 140 (in a path B, as best shown in the cross-sectional view of FIG. 2), or a flux is otherwise produced, such as through the use or motion of permanent magnets (not shown in this exemplary variation). Each of the first and second magnetic polar portions 120, 130 includes a plurality of poles 120a, 130a, respectively, such that a multiple pole rotor (e.g., 18 alternating polarity poles 120a, 130a) is created by the combination of the first and second magnetic polar portions 120, 130.

By using such magnetic poles 120a, 130a, this approach produces an alternating flux when moving past a flux conducting material completing a flux path, analogous to how poles on moving magnets are able to produce an alternating flux in coils when the magnets are moved proximate to such coils in a suitable orientation and direction (e.g., when the magnets move rotationally next to one or more coils having axes perpendicular and circumferential to the axis of the rotating magnets, as is common with some conventional generators or alternators). However, among other advantages, the approach shown in FIG. 1 may simplify manufacturing over a multiple wound approach, since many small diameter coils are not required.

Figure 2:
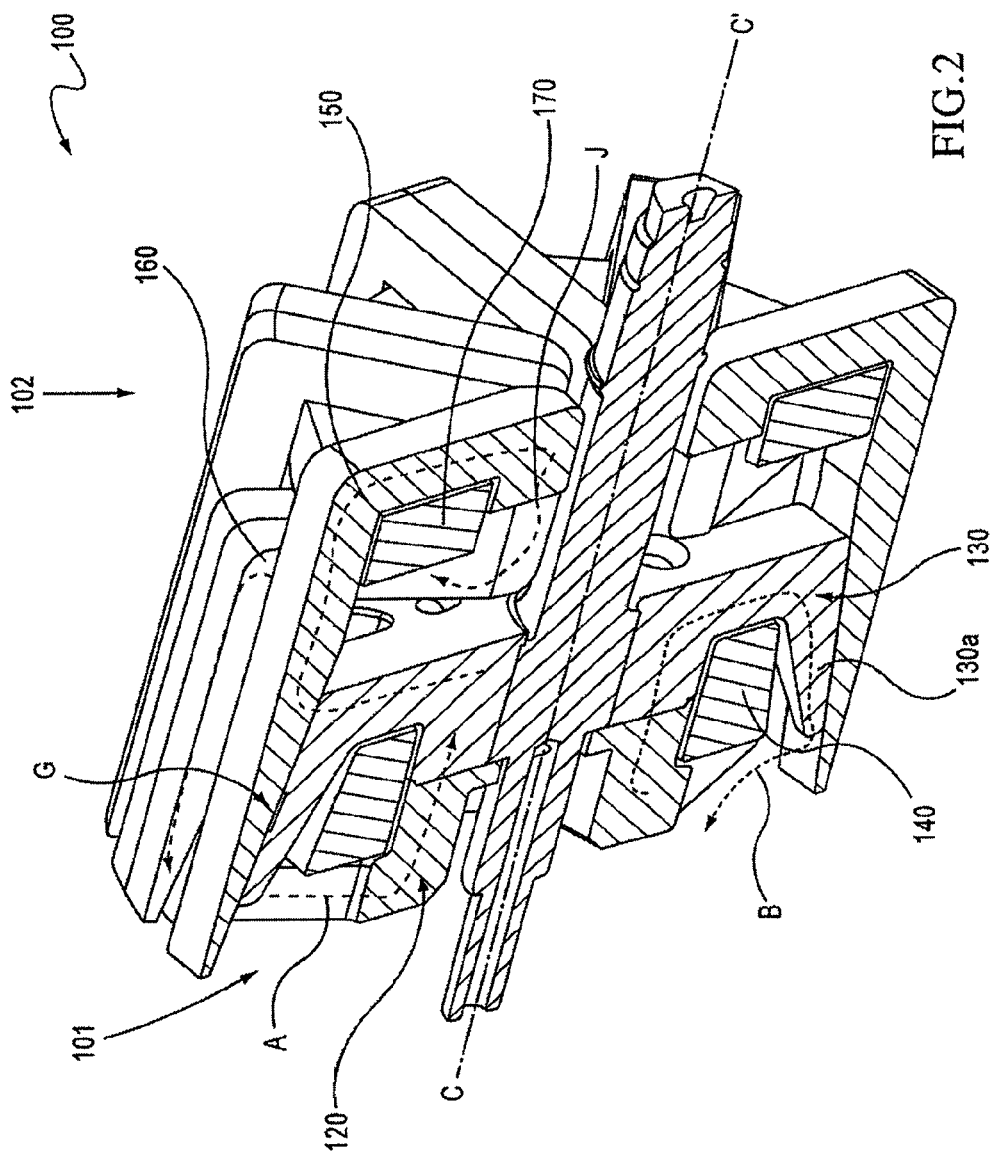
FIG. 2 is partial cross-sectional assembled view of the exemplary device of FIG. 1.

As further shown in FIG. 1 and in the partial cross-sectional assembled view of FIG. 2, in this first exemplary variation, a second, stationary portion 102 of the internal components of the device 100 includes a first laminated steel or other flux conducting material portion 150 and an output coil 170. As shown in FIG. 2, upon assembly, such that the rotating portion 101 nestably rotates within the stationary portion 102, in a first rotated position (as shown in FIG. 2) of the rotating portion 101 relative to the stationary portion 102, each first flux conducting portion 150 aligns with a second magnetic polar portion 130. The first flux conducting portion 150 partially wraps around a first portion of the output coil 170 to form a portion of flux path A, having flux, for example, in the direction of the arrowheads, that continues from the aligned second magnetic polar portion 130. Flux path A is such that the magnetic flux is directed through junction J between the first flux conduction portion 150 and a second flux conducting portion 160, as shown in FIG. 2. The second flux conducting portion 160 continues the flux path A through the center of the output coil 170 and about the nested rotating portion 101. In the position of the rotating portion 101 shown in FIG. 2, the flux path A then continues from the second flux conducting portion 160, which is aligned with the first magnetic polar portion 120, into the first magnetic polar portion 120, about the internal coil portion 140 and into the second magnetic polar portion 130, such that a completed flux path A is formed.

The side by side ("SBS")-shaped configuration (as opposed to the typical "nested" configuration of a typical related art automotive alternator, for example) shown in FIG. 1 (and also FIG. 2) presents one approach to enhancing three dimensional flux paths by locating laminated flux conducting material portions proximate to the magnetic polar portions 120, 130 in an "end-to-end" configuration. For example, as shown in FIGS. 1 and 2, the flux conducting portions 150, 160, may comprise laminated steel, such that abutted flat steel laminate portions make up each flux conducting portion 150, 160, with the direction of the flat steel laminate portions laminated lengthwise in the direction of the flow path A. FIG.

3A shows an exemplary representative view of the flux conducting material portion 150, comprising laminated steel portions, in accordance with aspects of the present invention. The approach of using laminations allows an essentially two dimensional flux conducting material (each laminate portion) to produce a three dimensional flow of flux (e.g., in path A shown in FIG. 2). Among other things, this approach may minimize eddy current and/or other flux related loss with respect to flux travel in direction A. Another exemplary approach, as discussed further below, also or alternatively includes use of tape-like wound coil features, such as those shown in FIGS. 4A-4C, within certain portions of the device. Alternatively to the use of such laminated or tape-like wound coil features, powdered metal, amorphous metal or metallic glasses or shaped laminations may be used for such portions. One potential drawback of use of such powdered metal or shaped laminations is typically increased cost.

In operation, as shown in FIGS. 1 and 2, as the rotating portion 101 rotates, each second flux conducting portion 160 eventually aligns with a second magnetic polar portion 130, and, due to the opposite polarity of the second magnetic polar portion 130 to the first magnetic polar portion 120, the direction of the flux path reverses.

The rotation of the rotating portion 101 and the travel of the flux about the flux paths formed by the aligning portions of the rotating portion 101 and the stationary portion 102 produces a varying flux through the output coil portion 170, such that a varying output is produced from the coil portion 170 (when operated, for example, as an electrical output generating device). This output may be, for example, generally sinusoidal in character. The output may be produced, for example, though wire leads connected to the coil portion 170 to provide an alternating current (AC) output for use in a selected application, such as to assist in operating an automobile engine and/or charge a battery (e.g., by rectifying the AC output into DC current). Similarly, the device 100 may be operated as an electrically driven device by alternatingly energizing the coil portion 170, producing a resulting rotation in the rotor portion 101.

Further, adjustment of the power output of the device 100 when operated as an alternator, for example, or the power input/output for operation of the device 100 as a motor may be obtained by altering the relative positions of the rotor portion 101 and the stator portion 102. For example, the size of the air gap G (FIG. 2) between the rotor portion 101 and the stator portion 102 may be increased or decreased by moving the rotor portion 101 relative to the stator portion 102 in the direction C-C'. Note that the surfaces of the magnetic polar portions 130, 120, and the surfaces of the flux conducting portions 150, 160, about the air gap G can make an oblique angle with respect to the axis of rotation C-C', as shown in FIG. 2. Using such an oblique angle for the surfaces of these components in the design of the device 102 improves the surface area of proximity for flux communication between the conducting portions 150, 160 and the magnetic polar portions 130, 120 and may increase operating efficiency.

An advantage of the approach of this variation of the present invention over some devices of the related art is that to, for example, double the pole count of the device, the poles can simply be reduced in size and doubled in number, without more complex and smaller turn diameter winding changes having to be made (e.g., not having to thread such windings about each pole), with the issue of copper or other conductor diameter of the windings thereby potentially becoming a limiting factor, due to physical constraints of some related art designs. Among other things, the lack of having to address changing conductor diameter also reduces the corresponding change in resistance that must be dealt with when changing conductor diameters are involved in a design change.

Further, the normal field losses of the variation of the present invention shown in FIGS. 1 and 2 does not vary significantly from field losses for conventional alternators and electric motors. Thus, since resistance losses tend to dominate with respect to efficiency in conventional alternators and electric motors, particular implementations of this variation of the present invention may allow much greater range in size and characteristics of device output, without the increased losses that result with conventional alternators and electric motors.

The flux conducting material portions 150, 160 of this variation of the present invention can be made of a number of materials. For example, in some variations, these portions 150, 160 comprise powdered or amorphous metal materials. In other variations, these portions 150, 160 comprise laminations that are joined to form each portion. Among other things, the use of such joined lamination portions overcomes difficulties in meeting the geometrical needs and limitations of materials (e.g., direction of flux relative to steel geometry, so as to minimize generation of eddy currents and other losses that can occur in connection with use of powdered metal materials) and overcoming limitations with typical availability of lamination materials of needed sizes and shapes. The lamination materials can comprise, for example, steel.

Figure 3A:
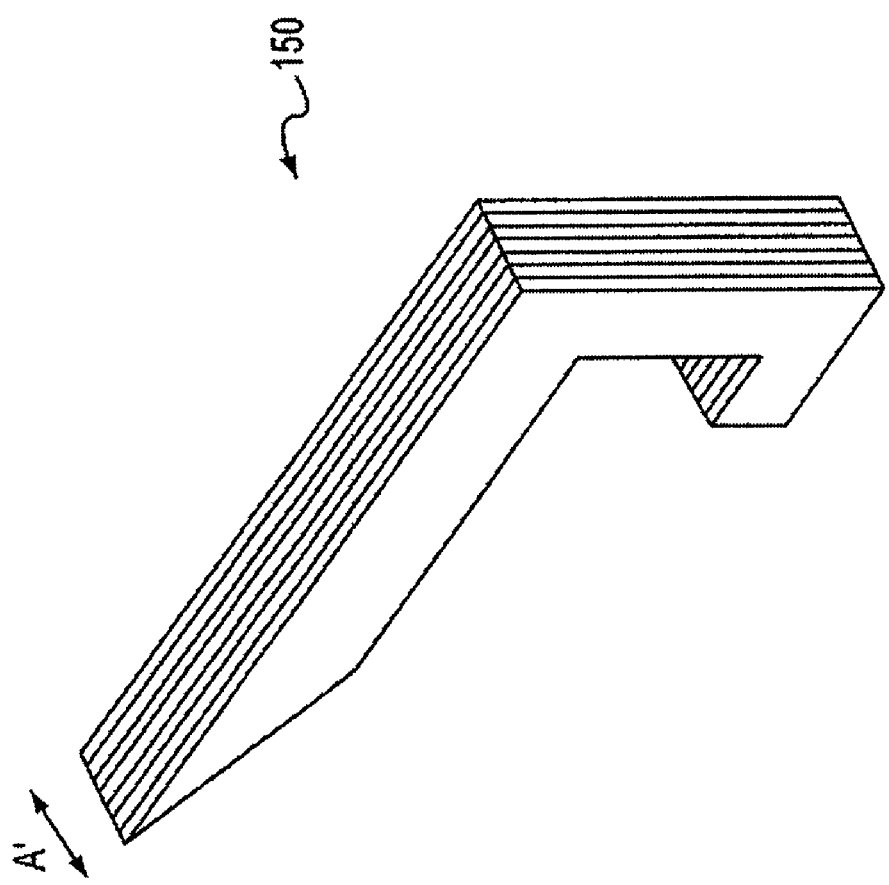
FIG. 3A is a representative view of an exemplary laminated construction flux conducting material component, usable in accordance with aspects of the present invention.
Figure 3B:
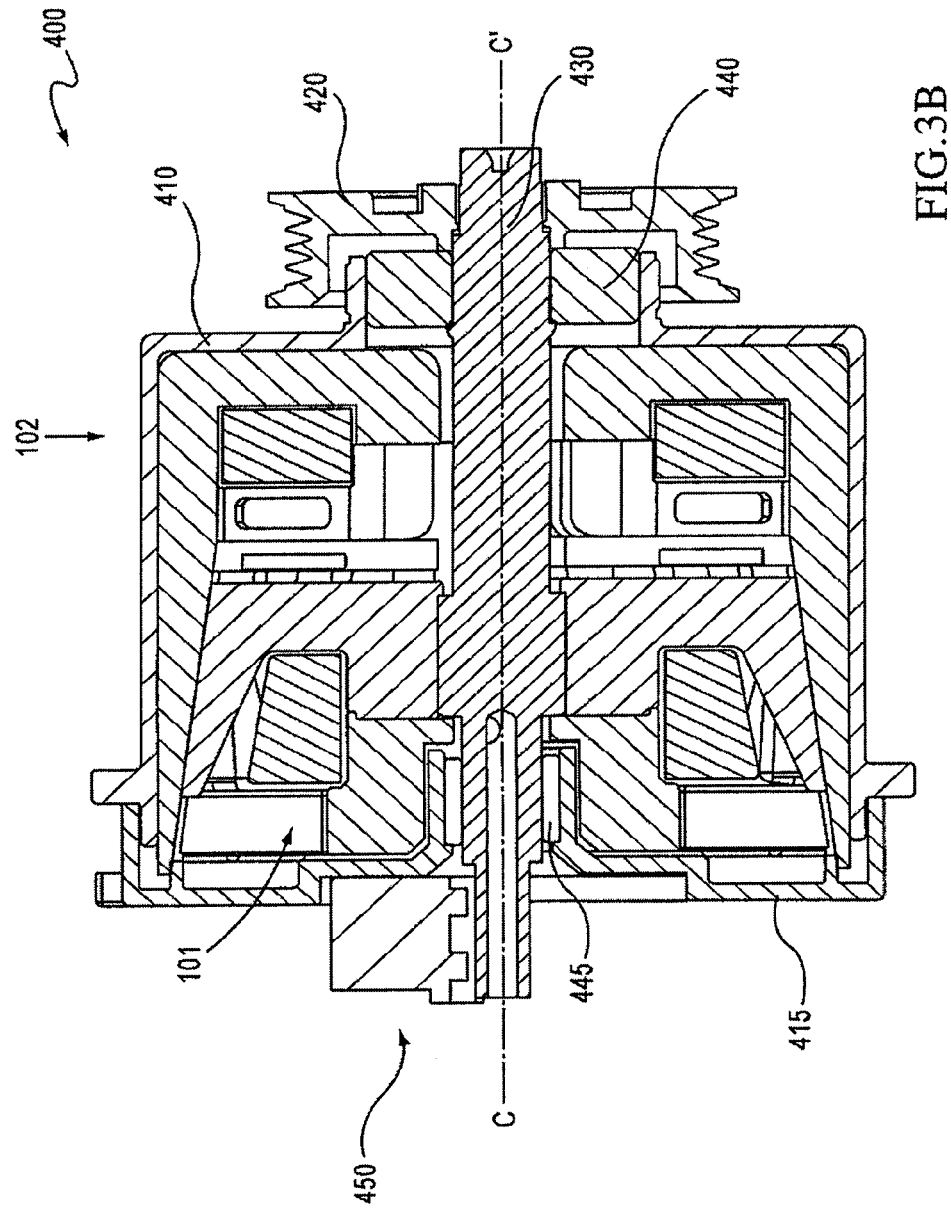
FIG. 3B is a cross-sectional view of an assembled exemplary electrical output device or electrically driven device having the internal components shown in FIGS. 1-2 and additional external and other components, in accordance with aspects of the present invention.

FIG. 3B is a cross-sectional view of an assembled exemplary device 400 having the internal components shown in FIGS. 1 and 2 and external and other components. As shown in the view of FIG. 3B, the fully assembled device 400 includes one or more housing portions 410, 415; an input rotational power pulley 420 for producing rotation of the rotating portion 101, in turn attached to a shaft 430 (the rotational power to rotate the input pulley 420 can be provided, for example, by a combustion engine having an output pulley operatively coupled, such as via a belt, to the input pulley 420); one or more friction reducing portions 440, 445, such as bearings and/or bushings, for rotationally slidably allowing the shaft 430 to rotate within the housing portions 410, 415; and fan components and/or other features, such as a brush assembly 450. Note that, in the variation of the present invention shown in FIG. 3B, the friction reducing portion 440 (e.g., bearing) is contained within a convex portion of the pulley 420, thereby reducing the overall size of the device 400 compared to a device using a pulley not so encompassing the friction reducing portion.

Alternative to the arrangement shown in FIG. 3B, the rotor and stator portions 101, 102 may be reversed, and the pulley 420 and/or other features attached to the shaft 430, as shown to the right in FIG. 3B, may be included on the shaft 430 to the left of the rotor and stator portions 101, 102, as shown in FIG. 3B. In this arrangement, the shaft 430 thereby does not need to extend fully through the device 430, thereby reducing overall device size and enabling additional room for use for components internal to the device 400.

In some variations of the device 400 of FIGS. 1-3B, the first and second magnetic polar portions 120, 130 of the first, rotating portion 101 comprise cast iron or steel, and are unlaminated. (Laminated material may also be used, for example, if a fixed frequency output is required, but for such application, the device may be poly phase and inverted.) Because there is no change in flux in this portion of the device 400, little or no eddy current or other similar current drains are typically generated, and therefore the use of lamination or other features to reduce these drains may not improve operation when used in these areas.

Among other advantages, the exemplary device 400 shown in FIGS. 1-3B allows the poles of the device 400 to be placed as far towards the outer edges of the device 400 as possible (among other things, thereby maximizing the size of the pole portions and maximizing the number that may be used for a given device size), while allowing the electrical coils 140, 170 to be placed as close as possible to the centerline (e.g., shaft 430) of the device 400, thereby minimizing the size, wire length, and weight of the windings used for a given device size; minimized winding size also minimizes the overall diameter of the device 400, to the extent this feature is important to a particular application. Further, among other things, increased numbers of poles allows higher frequency in device operation, with the maximum separation between poles, thereby minimizing flux leakage (see further discussion of flux leakage below).

In addition, with the device 400 of FIGS. 1-3B, the coils 140, 170 used are relatively short in length of winding compared to coils of related art motors and alternators, and have low resistance. As coils in the related art are often a primary source of heat, the heat generated by the device of FIGS. 1-3B is generally much less than the heat generated by typical related art motors and alternators.

Tape-Like Wound Toroidal and Other Device Portions

In some variations of electrical output generating devices and/or electrically driven devices in accordance with aspects of the present invention, flux conducting materials are also used inside the coil portions 140, 170, such as within the coil portions and between the flux conducting material portions 150, 160, as shown in FIGS. 1 and 2. One problem with the geometry of using the flux conducting materials within the coil portions 140, 170 shown in the arrangement of FIGS. 1 and 2, and in other locations having similar physical size limitations, is that the thickness of, for example, steel laminate layers may be constrained to be generally pie-shaped and to narrow significantly near the center of the coil portions 140, 170.

In some variations of electrical output generating devices and/or electrically driven devices in accordance with aspects of the present invention, the problem with physical size limitations, such as occurs within coil portions, may be addressed by using toroidal shaped flux conducting portions comprised of tape-like wound laminations. With these variations, the flux conducting material portions 150, 160 abut the toroidal shaped portion within the coil portions 140, 170.

Figure 4A:
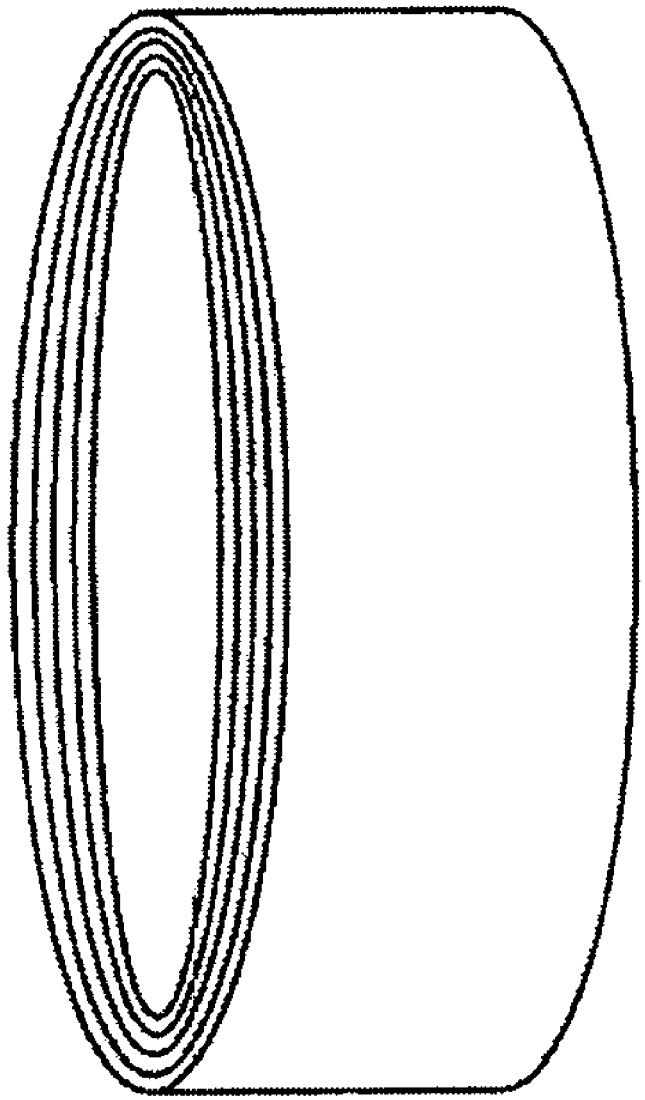
FIGS. 4A, 4B and 4C present representative views of a tape-like wound toroidal flux conducting component, in accordance with and for use in accordance with aspects of the present invention.
Figure 4B:
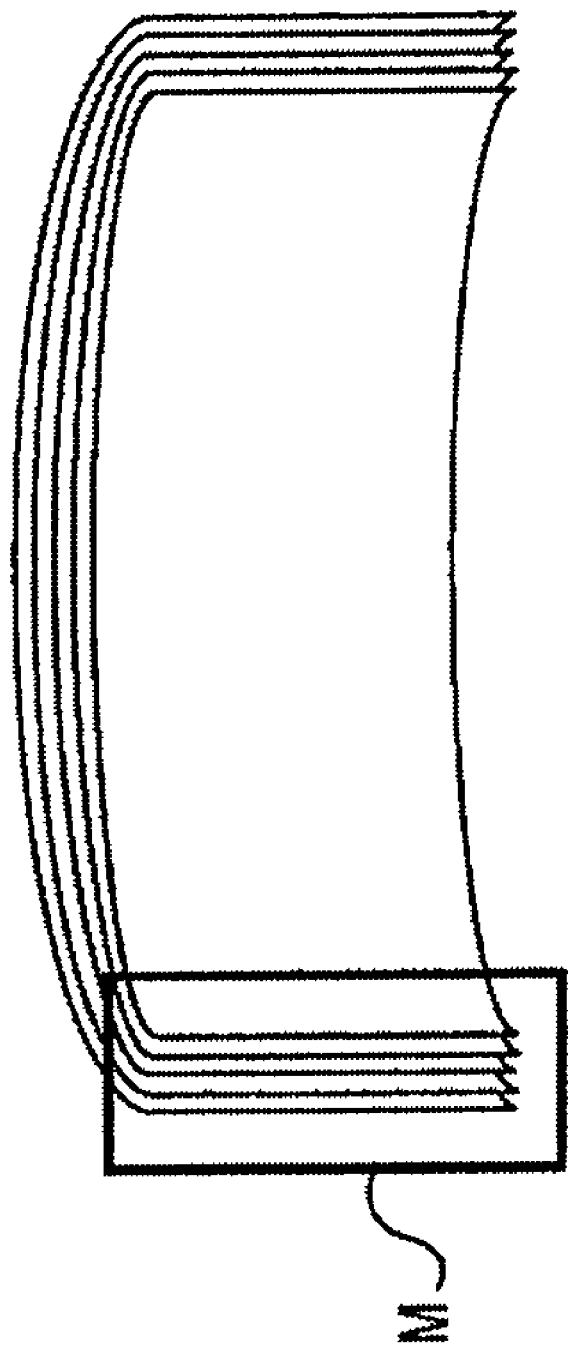
Figure 4C:
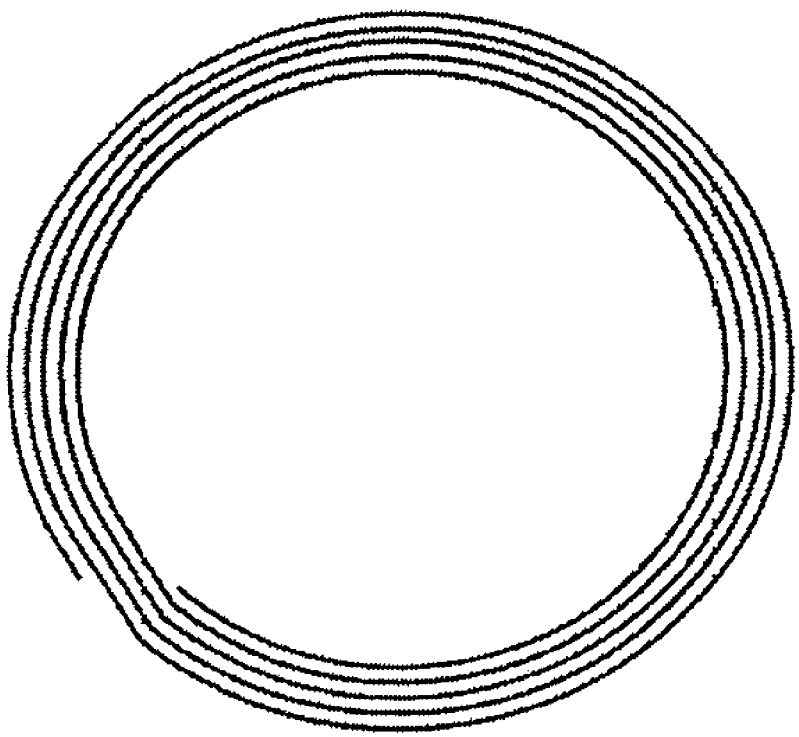

In some variations, the shape of this portion of the flux conducting material has a generally square or rectangular cross-sectional shape. The toroid is constructed of flux conducting material in a tape-like form. FIGS. 4A-4C present representative views of the flux conducting toroidal shape, in accordance with this variation. FIGS. 4A and 4B show a representative perspective drawing and a partial cutaway drawing, respectively, of an exemplary square or rectangular cross-sectionally shaped (see, e.g., area M of FIG. 4B) toroidal flux conductor. FIG. 4C is a representative drawing of the winding used to create the toroidal flux conductor of FIG. 1 from a side view, showing the "tape-like" wind features.

A similar result for this portion of the device (e.g., minimizing eddy current related and/or other losses affecting flux flow) can be achieved using powdered iron; however, powdered iron generally does not conduct magnetic flux as efficiently as, for example, steel laminate and does not include the physical layer features perpendicular to the direction of flow, further minimizing eddy current related and other losses. In addition, the use of powdered iron has the further drawback of increased hysteresis losses.

Similar to the use of the tape-like wound toroid for the flux conducting material portions, a tape-like wound toroid may be used to form the coil portions of the device (e.g., coil portions 140, 170 shown in FIGS. 1-3B). Among other things, the use of a tape-like toroid for the coil reduces resistance and allows higher packing density over circularly cross-sectionally shaped wire, due, for example, to the coil's square or rectangular cross-sectional shape.

Alternator With Reduced Flux Leakage

One often important factor in device performance for electrical output generating devices and/or electrically driven devices in accordance with aspects of the present invention is the amount of flux leakage that occurs. The practical effect of flux leakage is that current becomes limited; the device therefore has the appearance of operating "reactively," to limit power density. In the device 400 of the exemplary variation shown in FIGS. 1-3B, the closeness in proximity and lengthwise overlap of the adjacent rotor poles (e.g., 120a, 130a), in the direction parallel to the axis of rotation C-C', as well as the closeness in proximity and lengthwise overlap of adjacent flux conducting material stator portions 150, 160 relative to one another and relative to the rotor poles (e.g., 120a, 130a), also in the direction parallel to the axis of rotation C-C', can result in some "leakage" of flux between the poles and into the proximate flux conducting material portions at whatever point in rotation the rotating portion 101 is located at a particular moment in operation. For example, in the position shown in FIG. 2, since the direction of flux flow along path A in the first flux conducting material portion 150 is opposite the direction of the flux flow along path A in the second flux conducting material portion 160 and in the general flow direction from the second pole 130a toward the first pole 120a, flux may "leak" from the first flux conducting material portion 150 directly to the first pole 120a, rather than following flow path A, due, among other things, to the close proximity of these portions along their lengths in the direction C-C'.

Among other things, in order to reduce this reactive, flux leakage effect, the device of a second exemplary variation of the present invention, as shown in FIGS. 5-8 includes features in the rotating and fixed portions of the flux conducting material so as to reduce flux leakage by further physically isolating from one another portions of the flux conductive path that cause magnetic flux to flow in opposite, or different, directions.

Figure 5:
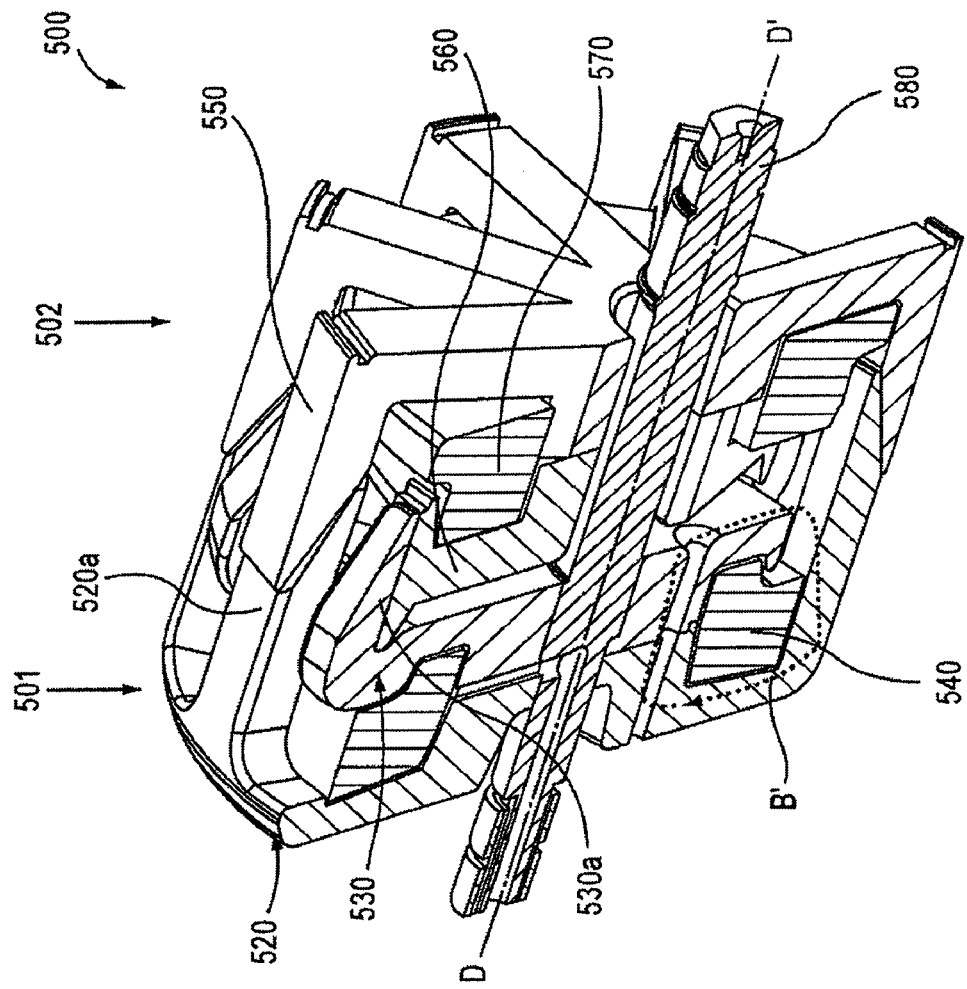
FIG. 5 shows the internal components of a second exemplary electrical output device or electrically driven device in an assembled view, in accordance with aspects of the present invention.

FIG. 5 shows the internal components 500 for a second exemplary device in an assembled view, in accordance with one variation of the present invention. Such a device is likewise usable in many driven rotation applications to produce electrical output, such as for use with an automobile engine.

As shown in FIG. 5, in this second exemplary variation, a first, rotating portion 501 and a second, stationary portion 502 of the internal components 500 of the device are in some ways similar in design and operation to those of the variation of FIGS. 1-3B and are usable, for example, in many typical automobile alternator and/or electric motor applications, among others. However, unlike the first exemplary variation of FIGS. 1-3B, in the variation of FIGS. 5-8, the rotating portion 501 does not nestably rotate within the stationary portion 502.

As shown in FIG. 5, the rotating portion 501 includes first magnetic polar portions (e.g., north magnetic poles) 520 and second magnetic pole portions (e.g., south magnetic poles) 530. The first and second magnetic polar portions 520, 530 encompass an internal coil portion 540, such as a coiled wire. The internal coil portion 540 receives an energizing current (e.g., a fixed current, such as a DC current). As a result of the energizing current in the coil portion 540, a flux is produced through the center of the coil portion 540 and about the outside of the coil portion, or a flux is otherwise produced, such as through the use or motion of permanent magnets (not shown in this variation). Each of the first and second magnetic polar portions 520, 530 includes a plurality of poles 520a, 530a, respectively, such that a multiple pole rotor (e.g., 18 alternating polarity poles 520a, 530a) is created by the combination of the first and second magnetic polar portions 520, 530. By using such magnetic poles 520a, 530a, this approach produces an alternating flux when moving past a point (e.g., when operated as an electrical output device). However, like the variation of FIGS. 1-3B, among other advantages, the approach shown in FIGS. 5-8 simplifies manufacturing over a multiple wound coil approach, since, among other things, many small diameter coils in close proximity to one another are not required.

As further shown in FIGS. 5-8, in this second exemplary variation, the second, stationary portion 502 of the internal components 500 of the device 800 includes a first laminated steel or other flux conducting material portion 550 and an output coil 570. As shown, for example, in FIGS. 5 and 6, in a first rotated position of the rotating portion 501 relative to the stationary portion 502, the first flux conducting portion 550 aligns with a corresponding pole 520a of the first magnetic polar portion 520. As shown in the partial cutaway view of FIG. 6, the first flux conducting portion 550 partially wraps around a first portion of the output coil 570 to form a portion of flux path A', having flux, for example, in the direction of the arrowheads, that continues from the aligned first magnetic polar portion 520. A second flux conducting portion 560 continues the flux path A' through the center of the output coil 570. In the position of the rotating portion 501 shown in FIG. 6, the flux path A' then continues from the second flux conducting portion 560, which is aligned with the second magnetic polar portion 530, into the first magnetic polar portion 520, the first and second magnetic polar portions 520, 530 partially encircling the internal coil portion 540, and the first magnetic polar portion 520 continuing the flux path A' back into the first flux conducting portion 550, such that a completed flux path A' is formed.

Figure 6:
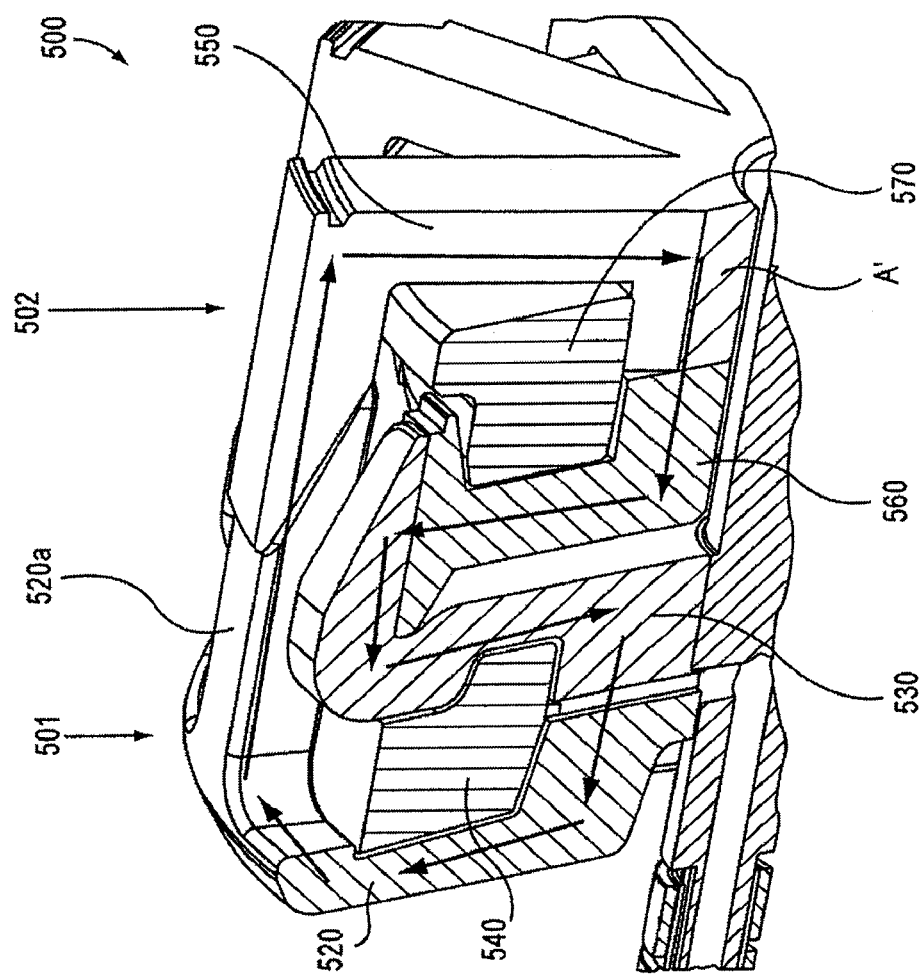
FIG. 6 is a partial cutaway view of the exemplary electrical output device or electrically driven device of FIG. 5.
Figure 7:
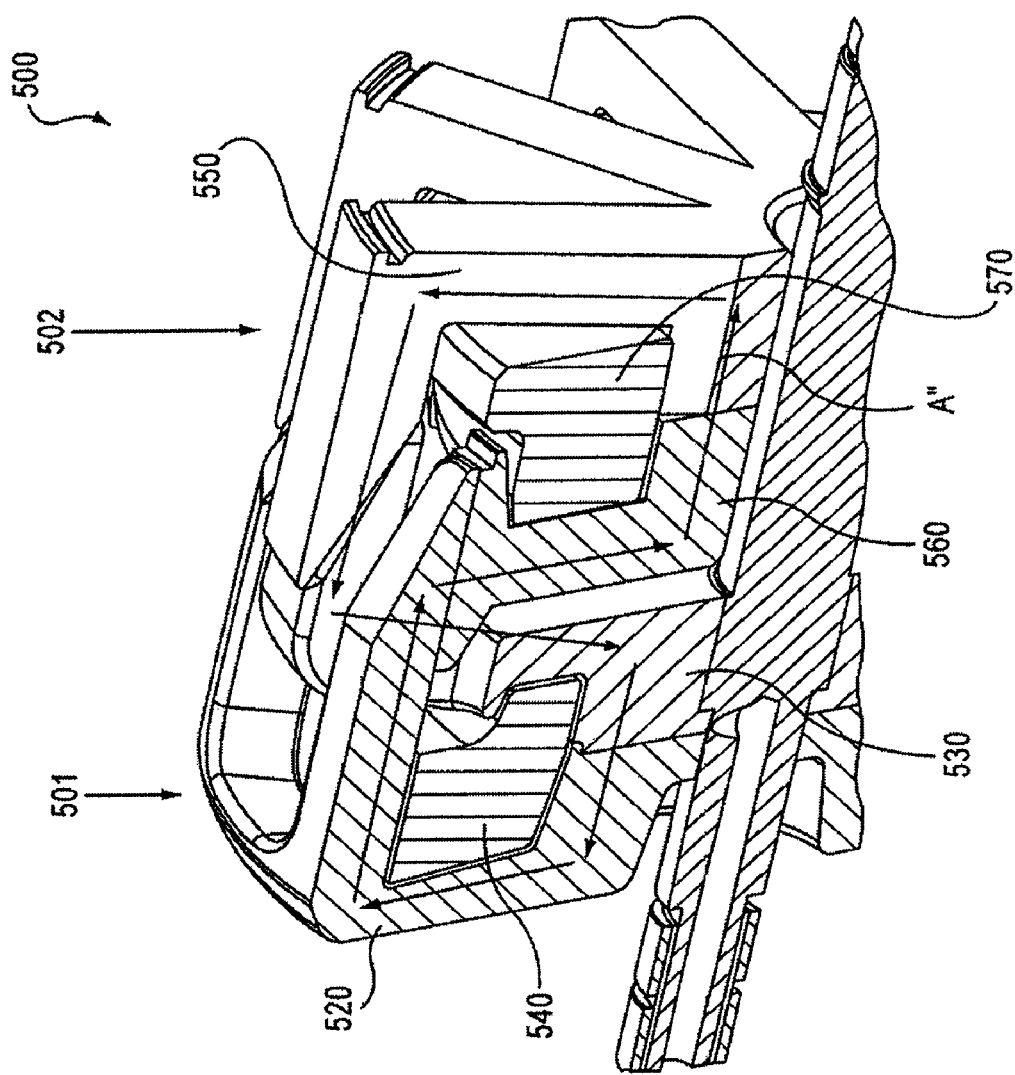
FIG. 7 is a partial cutaway view of the exemplary electrical output device or electrically driven device of FIG. 5, rotated relative to the view of FIG. 6.

In further operation, as shown in FIG. 7, as the rotating portion 501 rotates, the first flux conducing portion 550 eventually aligns with the second magnetic polar portion 530, and, due to the opposite polarity of the second magnetic polar portion 530 to the first magnetic polar portion 520, the direction of the flux path A'' reverses, as shown by the arrowheads, relative to the direction of the flux path A' shown in FIG. 6.

The rotation of the rotating portion 501 and the travel of the flux about the flux paths A', A'' formed by the aligning portions of the rotating portion 501 and the stationary portion 502 produces a varying flux through the output coil portion 570, such that a varying output is produced from the coil portion 570. This output, when the device is operated, for example, as an electrical output device, may be generally sinusoidal or otherwise alternating in character. The output may be produced, for example, though wire leads connected to the coil portion 570 to provide an AC output for use in a selected application, such as to assist in operating an automobile engine and/or charge a battery (e.g., by rectifying the AC output into DC current).

In addition to the advantages that may result from implementing the principles of the variation of FIGS. 1-3B, implementing the principles of the variation of the present invention shown in FIGS. 5-8 may include the advantage of minimizing flux leakage between the adjacent magnetic polar portions 520, 530 and flux conducting material portions 550, 560. This result is due at least in part to the reduced length of closely proximate overlapping adjacent magnetic polar portions 520, 530 and flux conducting material portions 550, 560 generally in a direction parallel to the direction D-D' of the axis of the shaft 580 of the device 500. For example, as shown in FIG. 6, in contrast to the variation of FIGS. 1-3B, flux through the first flux conducting material portion 550 does not travel along an adjacent path to flux through the second flux conducting material portion 560. In addition, neither the first flux conducting material portion 550 nor the second flux conducting material portion 560 is aligned with and overlapping along its length with either the first magnetic polar portion 520 or the second magnetic polar portion 530.

Figure 8:
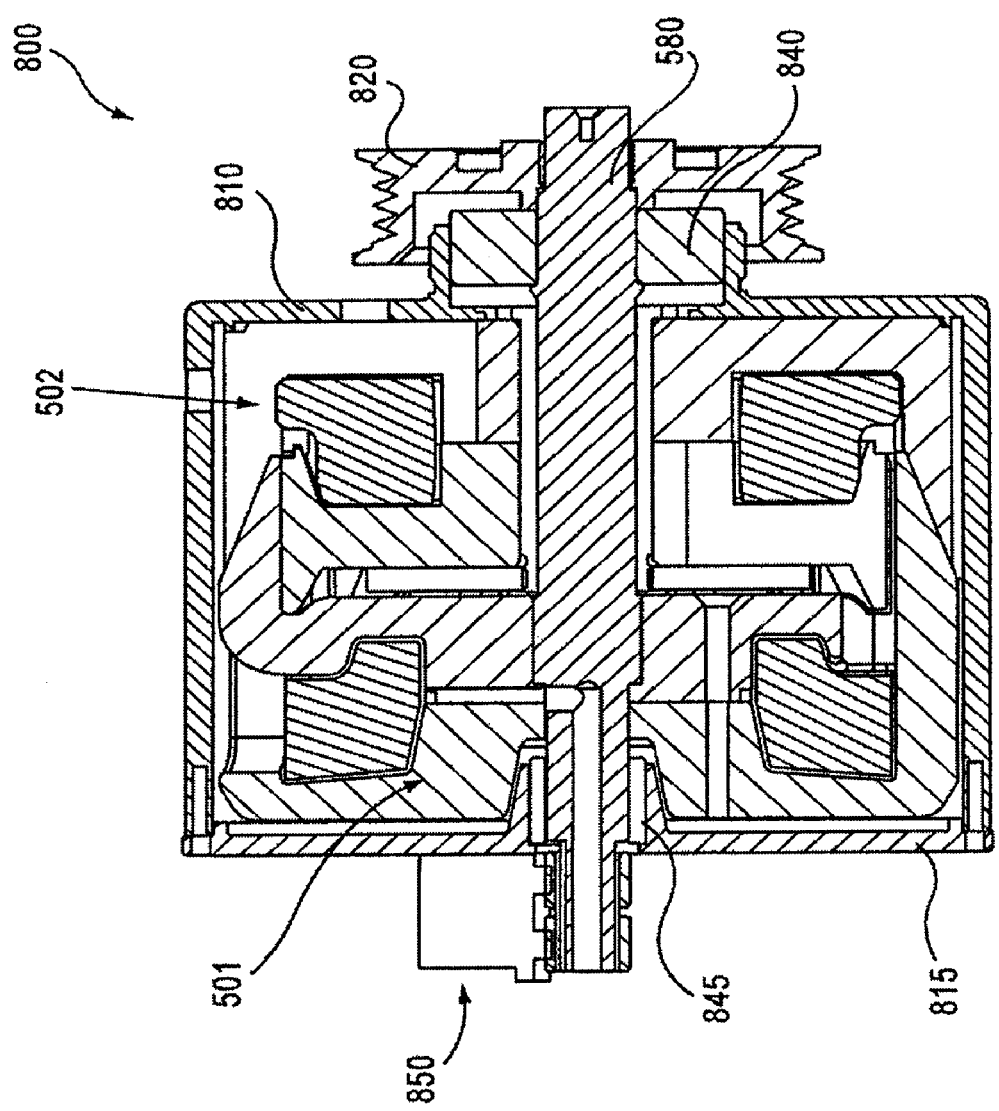
FIG. 8 is a cross-sectional view of an assembled exemplary electrical output device or electrically driven device having the internal components shown in FIGS. 5-7 and external and other components, in accordance with aspects of the present invention.

FIG. 8 is a cross-sectional view of an assembled exemplary device 800 having the internal components shown in FIGS. 5-7 and external and other components. As shown in the view of FIG. 8, the fully assembled device 800 includes one or more housing portions 810, 815; an input rotational power pulley 820 for producing rotation of the rotating portion 501, in turn attached to a shaft 580 (the rotational power to rotate the input pulley 820 can be provided, for example, by a combustion engine having an output pulley operatively coupled, such as via a belt, to the input pulley 820); one or more friction reducing portions 840, 845, such as bearings and/or bushings, for rotationally slidably allowing the shaft 580 to rotate within the housing portions 810, 815; and fan components and/or other features, such as brush related portions and features 850.

Similar materials and methods of construction to the materials and methods shown and described in conjunction with the device 400 of FIGS. 1-3B may be used in the construction of the device 800 of FIGS. 5-8. Also similar to the variation of FIGS. 4A-4C, in this variation of the present invention, square cross-section toroidal shaped flux conducting portions comprised of tape-like wound laminations may be used within the interior of the coil portions of the device to minimize eddy current related and other losses, and yet allow three dimensional flux flow. FIGS. 4A-4C illustrate representative views of a toroidal shaped flux conducting portion usable with some variations of the electrical output generating devices and/or electrically driven devices, such as those shown and described with reference to FIGS. 5-8. A similar result for this portion of the device (e.g., minimizing eddy current related and other losses) can be achieved using powdered iron; however, the use of powdered iron, generally does not conduct magnetic flux as efficiently as, for example, tape-like wound steel or laminate. In addition, the use of powdered iron has the further drawback of increased hysteresis losses, decreased flux density, and lower permeability. Alternatively, amorphous metals or metallic glasses may be used.

Flux Concentrating Rotor Based Device

In particular implementations of the rotor design for the device of the variations of FIGS. 1-3B and FIGS. 5-8, some flux leakage may still occur in the rotor (e.g., rotating portion 101 of FIGS. 1-3B and rotating portion 501 of FIGS. 5-8) between the poles, due to the proximity of the polar portions.

Figure 9A:
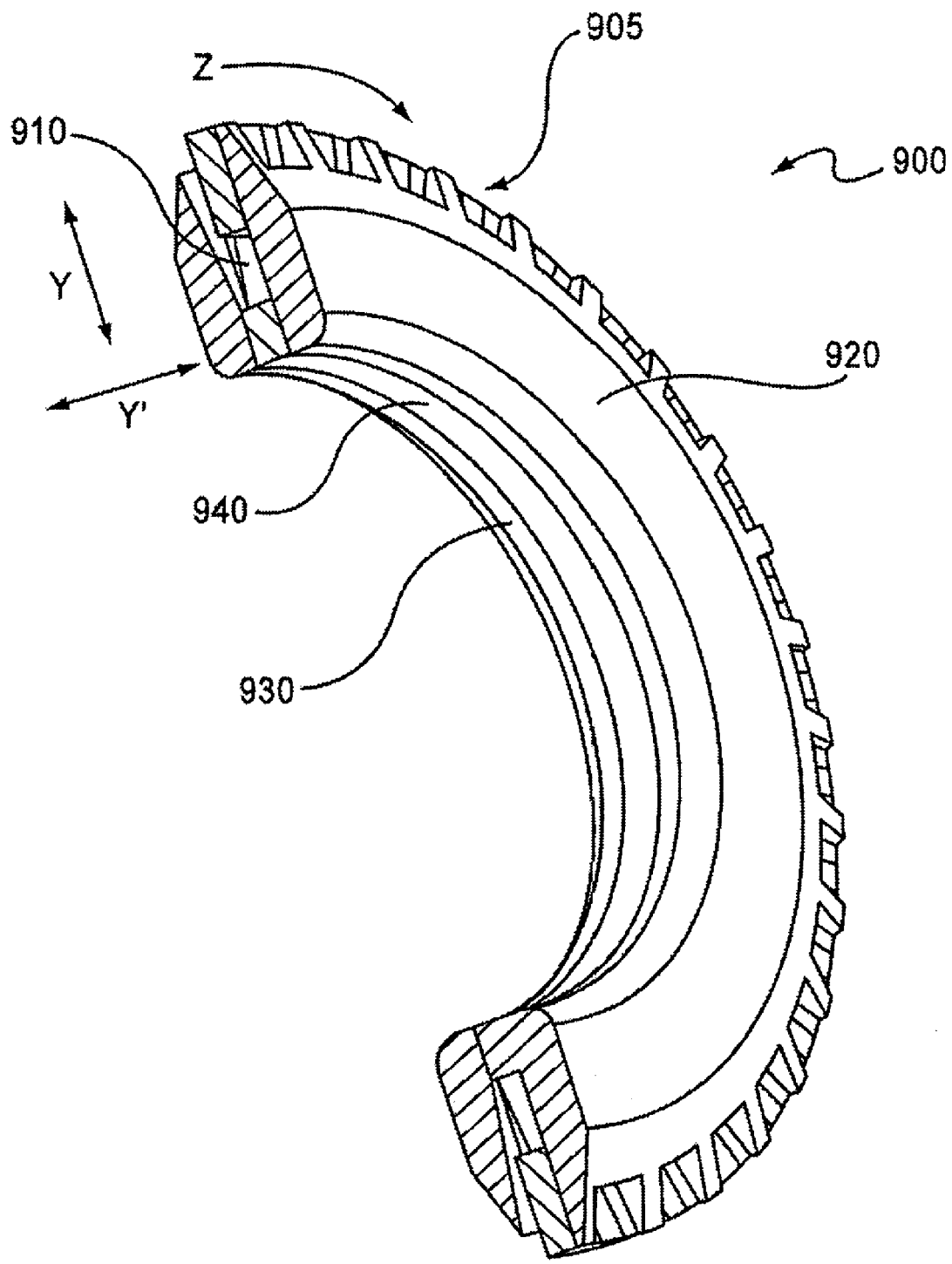

To reduce flux leakage in the rotor and to ease construction, among other things, especially in high pole count rotors, some variations of electrical output generating devices and/or electrically driven devices in accordance with aspects of the present invention may also be implemented using a rotor having poles at an outside edge, in conjunction with a stator sandwichably encompassing the rotor. FIGS. 9A and 9B illustrate views of an exemplary flux concentrating 72 pole rotor device, in accordance with one exemplary variation of the present invention.

Alternatively to the general orientation of the stator and rotor portions so as to have the generally larger cross sectional diameter along the axial direction Y shown in FIGS. 9A and 9B, the device of these figures may be designed such that the stator and rotor portions are oriented with a generally larger cross sectional diameter along the axial direction Y'. Among other things, the orientation in the Y' direction may allow the gap between the stator and rotor to be more easily adjusted, so as to alter power input/output of the device. In addition, the device of FIGS. 9A and 9B may be oriented such that the rotor portion 905 is located in the position of the core portion 940 (and vice versa), and the stator portions 920, 930 may include features such that the flux conductor portions 920*a* extend in proximity to the rotor portion 905 (e.g., in the direction E' as shown in FIG. 9B).

In FIGS. 9A and 9B, the permanent magnet portions of the poles for the rotor are located so as to minimize flux leakage. For example, as shown in FIG. 9A, the device 900 is a generally disk shaped and has layers that include an alternating magnet and flux concentrator portion at the middle outside edge of a cross-section of a rotor portion 905, an output windings portion 910 at the center of the cross-section of the device 900, stator portions 920, 930, and a toroidal tape-like wrapped core portion 940.

The rotor portion 905 is rotatable relative to the stator flux portions 920, 930, which generally are fixedly located (e.g., by attachment to a housing).

Figure 9C:
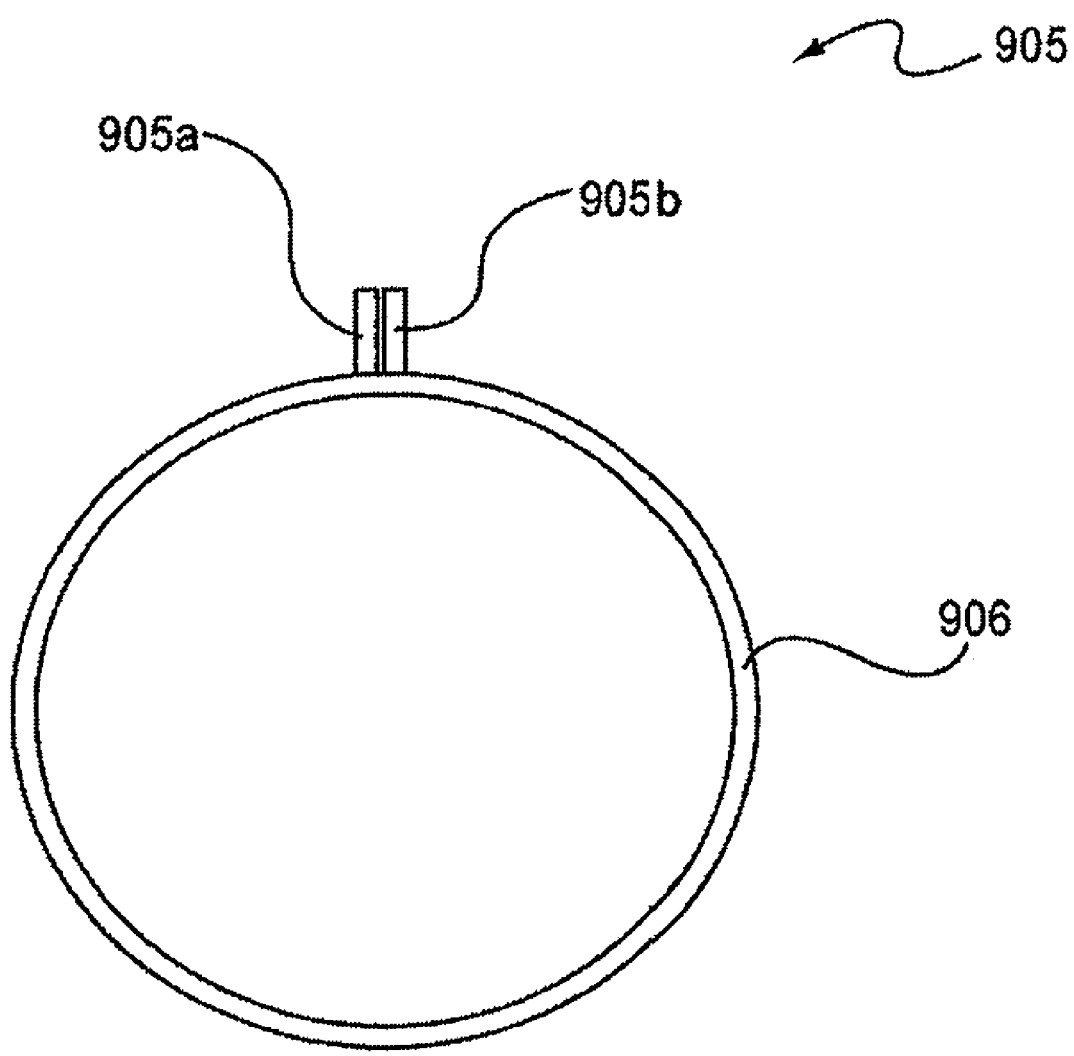
FIG. 9C presents a representative view of an exemplary alternating magnet and flux concentrator portion of an electrical output device or electrically driven device, in the process of assembly in accordance with aspects of the present invention.
Figure 9E:
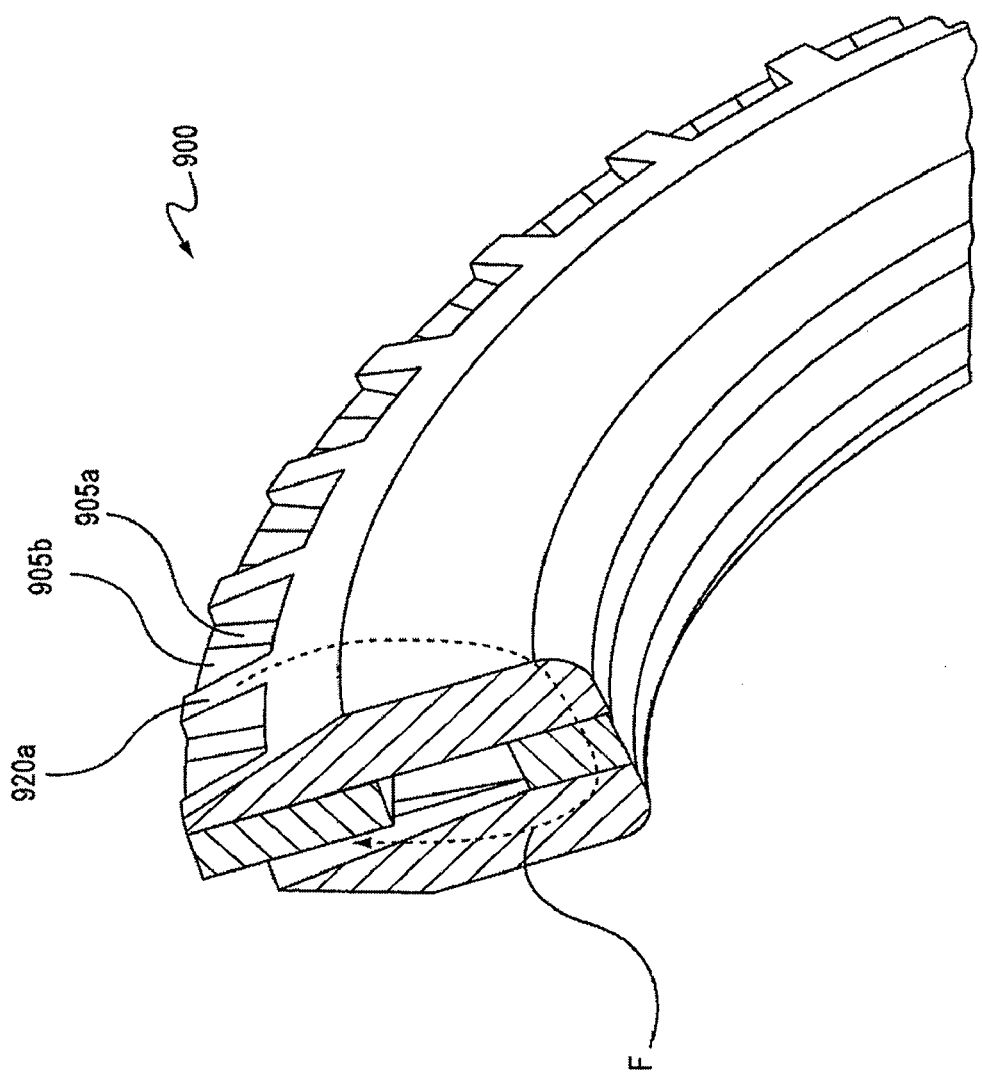
FIG. 9E is a partial cutaway view of the electrical output device or electrically driven device of FIG. 9B.
Figure 9F:
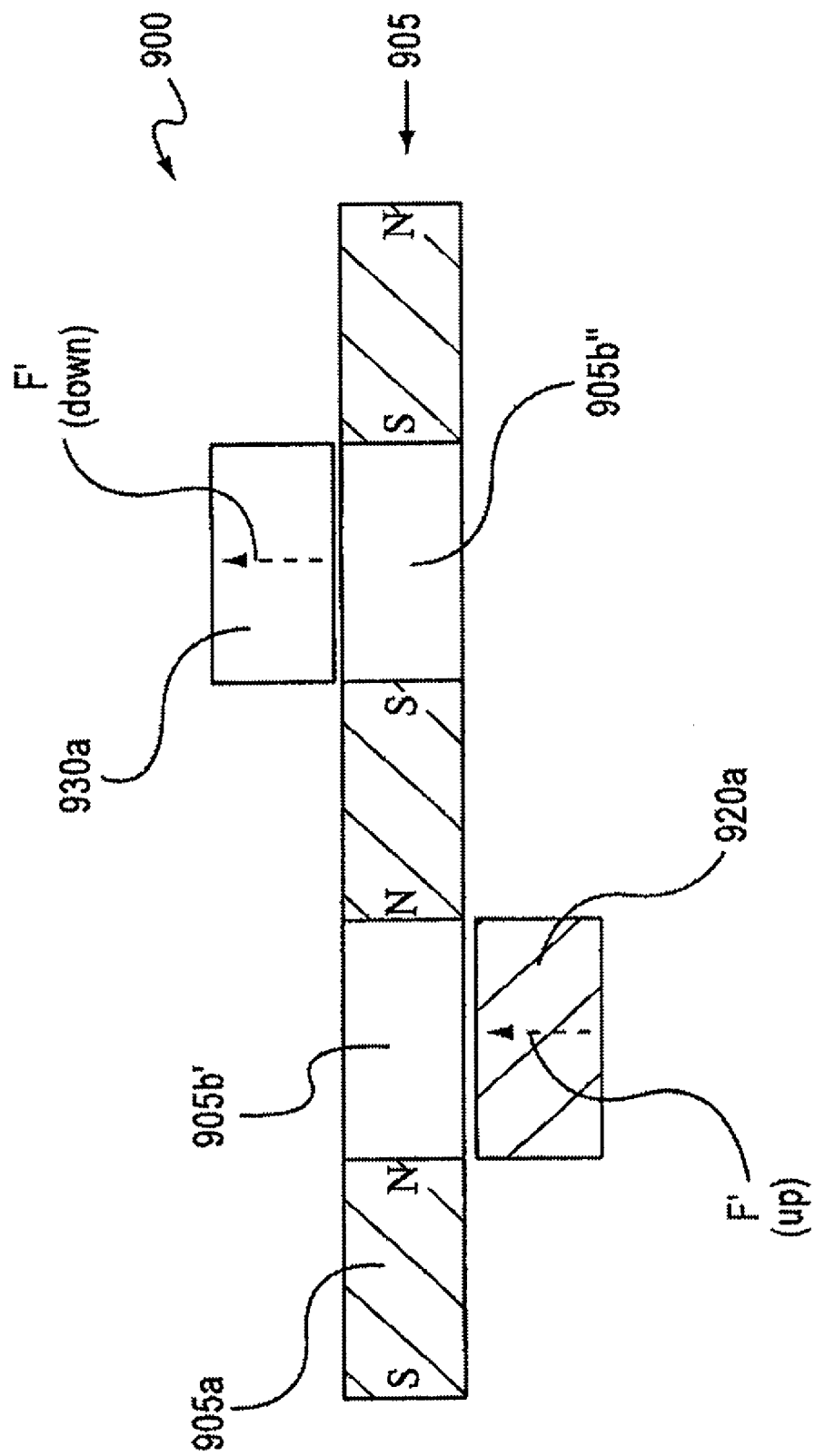
FIG. 9F shows a representative view of the electrical output device or electrically driven device of FIG. 9D at a slightly rotated rotor position relative to the position of FIG. 9D.
Figure 9G:
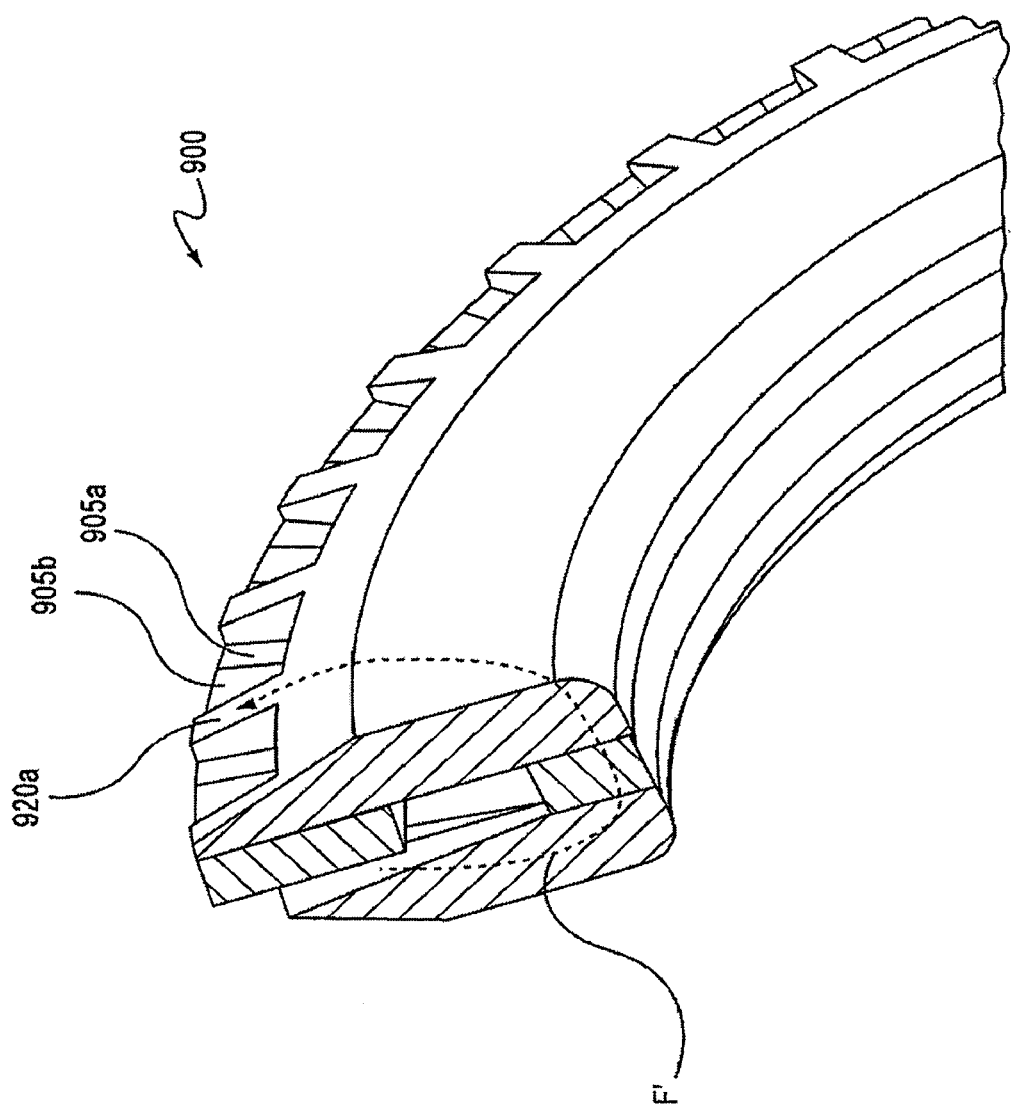
FIG. 9G is a partial cutaway view of the electrical output device or electrically driven device of FIG. 9B, after rotation of the rotor as shown in FIG. 9F.

As further shown in close-up in FIG. 9B, the rotor portion 905 includes alternating magnet portions 905*a*, such as one pole of a magnet (successive magnet portions having opposite orientations as further shown in FIGS. 9D and 9F), and flux concentrator portions 905*b* formed of a flux inducing material, such as iron.

In a first exemplary variation, rotor portion 905 may be constructed, for example, by assembling discrete magnet portions with discrete sections of iron or other flux inducing materials, such as by adhering or otherwise attaching the discrete portions and pieces to a ring portion. FIG. 9C presents a representative view of an exemplary rotor portion 905 in the process of construction, in accordance with an exemplary method of constructing an electrical output generating device and/or electrically driven device of the present invention. As shown in FIG. 9C, each magnet portion 905*a* is adhered to a ring portion 906 and to a flux concentrator portion 905*b*, such as by gluing, welding, bolting, or otherwise coupling, adhering, or attaching.

In a second exemplary variation, rotor portion 905 is constructed via a method similar to that shown in FIG. 9C, but without use of the ring 906 (e.g., by simply adhering or otherwise attaching each magnet portion 905*a* to adjacent flux concentrator portions 905*b* so as to form a ring). In a third exemplary variation, the rotor portion 905 is constructed by inducing magnetic poles onto a magnetizable ring, so as to produce a desired number of alternating poles separated by unmagnetized flux concentrator portions 905*b*.

In a fourth exemplary variation, the rotor portion 905 is constructed by placing the flux concentrator portions 905*b* in a mold and then injection molding or otherwise adding the magnet portions 905*a* between the flux concentrator portions 905*b*. The magnet portions are magnetized appropriately.

As also further shown in FIG. 9B, the stator portions 920, 930 comprise a material or materials to encourage flux (e.g., steel laminate, powdered metal or amorphous metal) and include flux extensions (e.g., 920*a*) alternately alignable with the flux concentrator portions 905*b* during rotation of the rotor portion 905 relative to the stator flux portions 920, 320. In some variations, the stator portions 920, 930 may also be formed as a single contiguous piece. Generally, flux occurs through each flux extension 920*a* of a first stator portion 920 when each flux extension 920*a* is aligned with one of the flux concentrator portions 905*b* of the rotor 905.

Among other things, the design of the stator portions 920, 930 is such that, in operation, flux on one side (e.g., stator portion 920) is approximately the same throughout that side and opposite in polarity to the flux in the side opposite the rotor 905 (e.g., stator portion 930).

The toroidal tape-like wrapped core portion 940 may be constructed, for example, similarly to that shown in FIGS. 4A-4C.

In operation, in the device of FIGS. 9A-9B, the rotor 905 rotates relative to the stator portions 920, 930. FIGS. 9D-9G show representative views of elements of the rotor 905 and stator portions 920, 930 in operation. FIG. 9D shows a representative view of the device 900 of FIGS. 9A-9B from a view perpendicular to the direction E-E' shown in FIG. 9B. In the representative view of FIG. 9D, a first flux concentrator portion 905*b* is aligned with and located proximate to a first stator portion extension 920*a*. As can be seen in FIG. 9B, each of the magnet portions 905*a* has a first polarity end (N) and a second polarity end (S). Sequential magnet portions 905*a* are oriented such that each flux concentrator portion 905*b*, 905*b*' abuts two magnet portions 905*a*, which, in turn, are oriented 180.degree. relative to one another, so that each flux concentrator portion 905*b*, 905*b*' abuts the same polarity end of the two abutting magnet portions 905*a*.

With the magnet portions 905*a* arranged as shown in FIG. 9D, each flux concentrator portion 905*b*, 905*b*' is positionable proximate to a maximum area of either N or S pole field, with the field varying minimally within the flux concentrator portion. Among other things, the arrangement of FIG. 9D thereby allows lower grade flux conducting materials (e.g., lower grade steel) to be used, rather than, for example, high flux conducting materials, such as iron. As a result, for example, cost may be reduced.

In the variation of FIGS. 9A-9B, rotor portions 920, 930 may be rotatably adjusted relative to each other so as to selectively decrease power and increase speed without increasing voltage, subject to losses and mechanical constraints, for operation as a motor, and to regulate power toward zero, for operation as a generator, or to allow high revolution per minute (RPM) operation as a motor.

For example, in the first position of the rotor 905 relative to the stator extension 920*a*, 930*a*, the first flux concentrator portion 905*b* sandwichably abuts S poles of the two magnet portions 905*a*. A second flux concentrator portion 905*b*' sandwichably abutting N poles of two magnet portions 905*b* is aligned with and located proximate to a second stator extension 930*a*. As shown in FIG. 9D and the partial cutaway view of FIG. 9E, flux generally travels in the direction F in this position of the rotor 905.

FIG. 9F shows a representative view of the device 900 of FIGS. 9A-9B from a view perpendicular to the direction E-E' shown in FIG. 9B, in a second, rotated rotor position. In the representative view of FIG. 9F, the second flux concentrator portion 905*b*' is aligned with and located proximate to the first stator portion extension 920*b*. A third flux concentrator portion 905*b*" is aligned with and located proximate to a second stator extension 920*a*. As shown in FIG. 9F and the partial cutaway view of FIG. 9G, flux generally travels in the direction F' in this position of the rotor 905.

Yet another feature of the variation of FIGS. 9A-9G, and as applicable to some other variations of the present invention, is variability in rotational aspects of the output windings portion 910 of the device 900. For example, because the output produced by the output portion 910 of the device 900 is independent of any rotational motion of the output windings portion 910 along the direction of its windings (e.g., in the direction Z shown in FIG. 9A), the output windings portion 910 may selectively be designed to rotate with the rotor portion 905, for example, or to remain stationary with the stator or toroidal portions 920, 930, 940, as convenient, without affecting performance. Thus, for example, output of the output windings portion 910 may selectively be fixably held, so as to produce output (e.g., when the device 900 is operating as an electrical output device) in the same rotational motional frame (e.g., none) of the stator portions 920, 930, or may produce output while rotating in the same rotational frame as the rotor portion 905, without requiring the use of any features (e.g., slip rings) in order to translate the output to the selected rotational motion.

Flux Concentrating Rotor Based Device With Variable Timing

Figure 10:
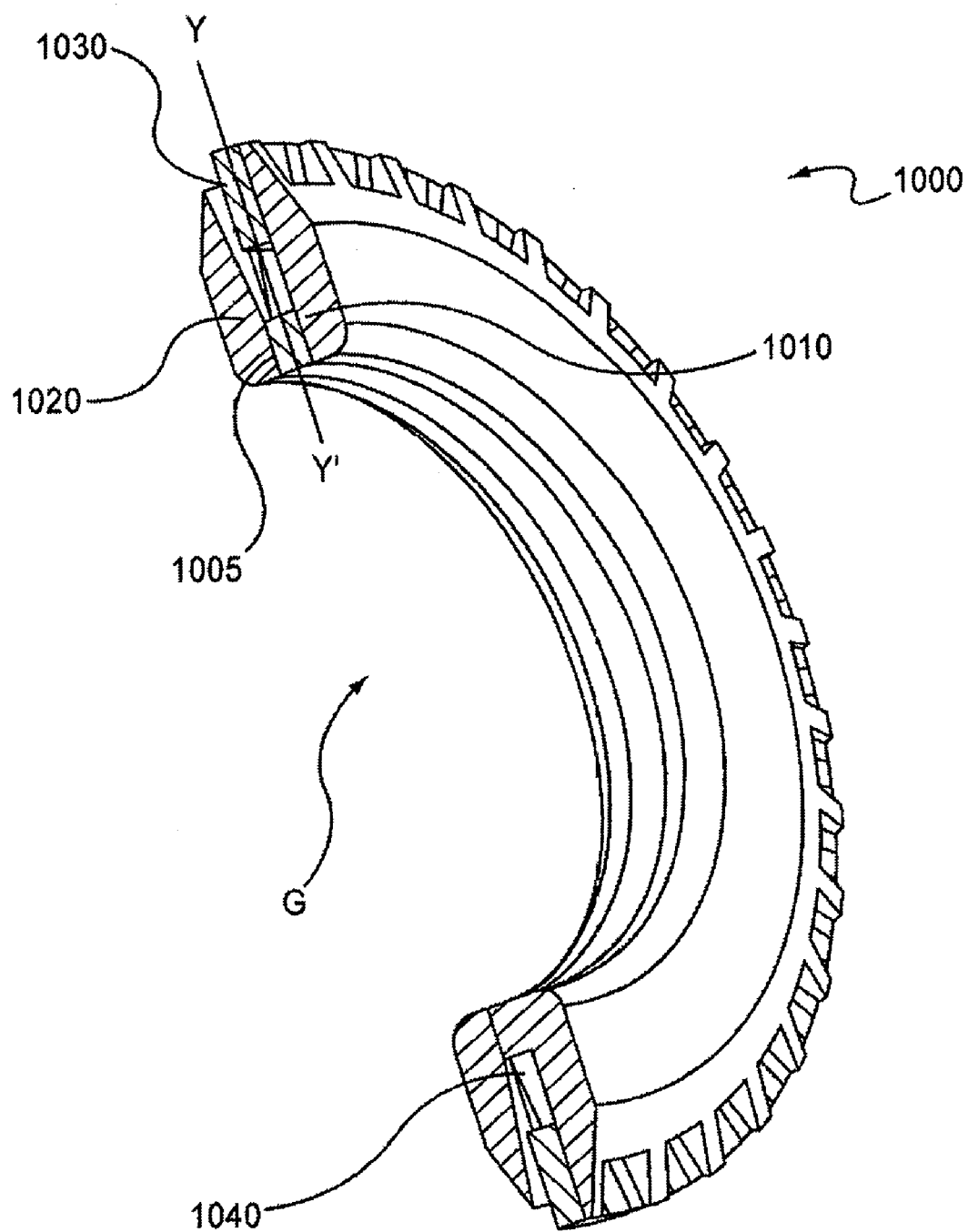
FIG. 10 presents another variation of a flux concentrating rotor similar to the variation shown in FIGS. 9A-9G.
Figure 11:
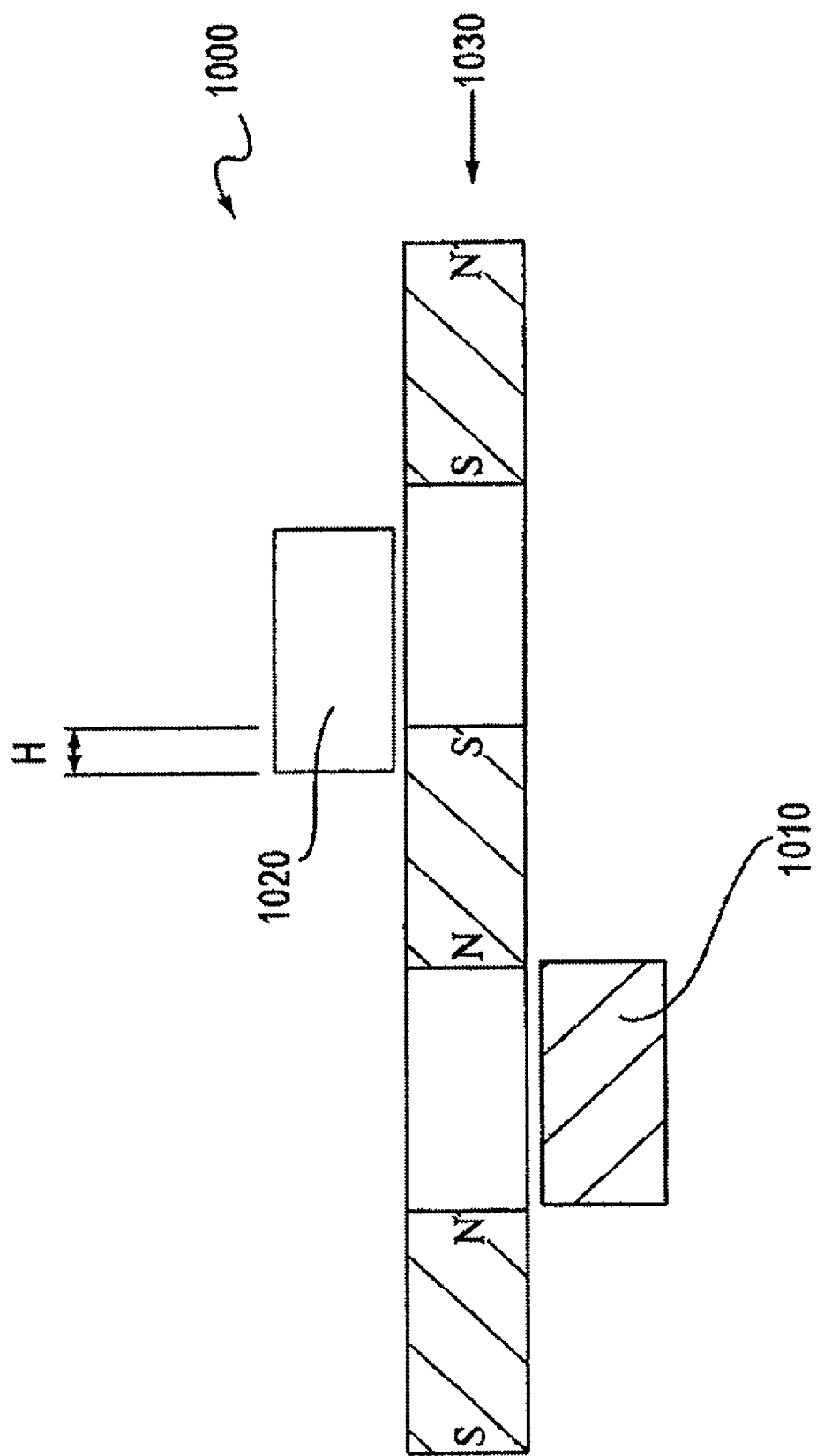
FIG. 11 shows a representative view of the electrical output device or electrically driven device of FIG. 10 from a view perpendicular to the direction Y-Y' shown in FIG. 10.

FIGS. 10 and 11 present another particular implementation of a flux concentrating rotor similar to the variation shown in FIGS. 9A-9G. However, in the variation shown in FIGS. 10 and 11, the stator portions 1010, 1020 of the device 1000 are divided along a frictional plane or other surface 1005, such that the first stator portion 1010 is rotatable relative to the second stator portion 1020. For example, the second stator portion 1020 may be fixably held to a housing, and the first stator portion 1010 may be movable via rotation about a central point G via, for example, a slot in the first stator portion 1010 in which a moveable pin is received (e.g., a servo motor, or a biasing mechanism, such a spring, to which the pin is attached allows the first stator portion 1010 to be selectively rotated relative to the second stator portion 1020).

Operation of the variation of FIGS. 10-11 is similar to that for the variation shown in FIGS. 9A-9G; however, the "timing" of flux transmitted between the first stator portion 1010 and the second stator portion 1020 may be varied relative to one another and relative to the rotor 1030. FIG. 11 shows an end view of the relative positions of the rotor 1030, first stator portion 1010, and second stator portion 1020. FIG. 11 is similar to FIG. 9D; however, compared to the position of the rotor 905 and two stator portions 920, 930 shown in FIG. 9D, the first stator portion 1010 of FIG. 11 has rotated slightly, by a rotational distance H, relative to the second stator portion 1020. (Note that, in one variation, as the first stator portion 1010 and second stator portion 1020 approach alignment relative to one another, flux across the windings portion 1040 approaches zero.)

One result of such change in timing of the two stator portions relative to one another and relative to the rotating rotor is that the amount of flux through the device varies, typically so as to reduce flux. One value of the capability of the device of this variation to so reduce flux is that voltage generated may correspondingly be decreased. In addition, the device may be configured to operate differently at different speeds, for example (e.g., to output the same voltage across a range of speeds when operating as an alternator).

This capability may be useful, for example, in certain applications of an alternator or motor. For example, in an automotive application, it may be desired to regulate the output of the alternator for purposes of operating the automobile electrical components and/or charging the battery. The timing feature of this variation may be used to provide such alternator output regulation.

Similarly, the device of FIGS. 10 and 11 may be configured to operate as a motor, with output of the motor RPM varying as a function of the timing features for a given power and voltage input. Further, the device may be variably operable to function as an alternator or a motor, depending on the voltage input, output, and timing.

Example variations and implementations of aspects of the present invention have now been described in accordance with the above advantages. It will be appreciated that these examples are merely illustrative of the invention. Many variations and modifications will be apparent to those skilled in the art.

In places where the description above refers to particular implementations of electrical output generating devices and/or electrically driven devices, it should be readily apparent that a number of modifications may be made without departing from the spirit thereof and that these aspects, implementations, and variations may be applied to other electrical output generating devices and/or electrically driven devices. The presently disclosed aspects, implementations, and variations are therefore to be considered in all respects as illustrative and not restrictive. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An electrical machine, comprising:
    a rotor assembly comprising a first set and a second set of rotor extensions; and
    a stator assembly comprising a first set and a second set of stator extensions;
    wherein rotating the rotor assembly about an axis alternates the rotor assembly between a first position and a second position,
    wherein, in the first position, each of the first set of rotor extensions transfers flux to one of the first set of stator extensions, and each of the second set of rotor extensions transfers flux to one of the second set of stator extensions,
    wherein, in the second position, each of the first set of rotor extensions transfers flux to one of the second set of stator extensions, and each of the second set of rotor extensions transfers flux to one of the first set of stator extensions, and
    wherein the electrical machine is at least one of a transverse flux machine or a commutated flux machine.

2. The electrical machine of claim 1, wherein each rotor extension has a rotor extension surface,
    wherein each stator extension has a rotor end having a stator conductor surface,
    wherein each stator extension has an interior end,
    wherein the interior ends of the first set of stator conductor extensions abut the interior ends of the second set of stator conductor extensions at an abutting junction,
    wherein, in the first position, magnetic flux is conducted across the abutting junction in a first direction, and
    wherein, in the second position, magnetic flux is conducted across the abutting junction in a second direction.

3. The electrical machine of claim 1, wherein the rotor extensions and the stator extensions transfer flux across an air gap therebetween, the air gap making an oblique angle with respect to the axis.

4. The electrical machine of claim 1, wherein each of the stator extensions is a separate piece.

5. The electrical machine of claim 1, further comprising a rotor coil located outside of the stator assembly.

6. The electrical machine of claim 1, wherein at least one of the rotor assembly and the stator assembly comprise at least one of laminated steel, powdered metal, or amorphous metal.

7. The electrical machine of claim 1, further comprising a rotor coil and a stator coil.

8. The electrical machine of claim 7, wherein a varying current is input to at least one of the rotor coil or the stator coil.

9. The electrical machine of claim 7, wherein a varying current is output from at least one of the rotor coil or the stator coil.

10. The electrical machine of claim 1, wherein the rotor assembly and the stator assembly are configured with a "side by side" configuration.

11. The electrical machine of claim 1, wherein each of the first set of rotor extensions has a first surface and a second surface, the first surface and the second surface disposed on opposing sides of the rotor extension, wherein, in the first position, flux is transferred from each of the first set of rotor extensions to one of the first set of stator extensions via the respective first surfaces, and wherein, in the second position, flux is transferred from each of the first set of rotor extensions to one of the second set of stator extensions via the respective second surfaces.

12. The electrical machine of claim 1, further comprising:

a first coil at least partially surrounded by the rotor assembly;

a second coil at least partially surrounded by the stator assembly;

wherein, in the first position, flux is conducted around the first coil in a substantially clockwise direction, wherein, in the first position, flux is conducted around the second coil in a substantially counterclockwise direction, wherein, in the second position, flux is conducted around the first coil in a substantially counterclockwise direction, and wherein, in the second position, flux is conducted around the second coil in a substantially clockwise direction.

13. The electrical machine of claim 1, wherein at least one of the rotor assembly or the stator assembly is moveable in an axial direction in order to vary an air gap between the rotor extensions and the stator extensions.

14. A method of generating a current in an electrical machine, the method comprising:

rotating a rotor assembly about an axis to alternate the rotor assembly between a first position and a second position with respect to a stator assembly, wherein the rotor assembly comprises a first set and a second set of rotor extensions, wherein the stator assembly comprises a first set and a second set of stator extensions, wherein, in the first position, each of the first set of rotor extensions transfers flux to one of the first set of stator extensions, and each of the second set of rotor extensions transfers flux to one of the second set of stator extensions, wherein, in the second position, each of the first set of rotor extensions transfers flux to one of the second set of stator extensions, and each of the second set of rotor extensions transfers flux to one of the first set of stator extensions, and wherein the electrical machine is at least one of a transverse flux machine or a commutated flux machine.

15. The method of claim 14, wherein each rotor extension has a rotor extension surface, wherein each stator extension has a rotor end having a stator conductor surface, wherein each stator extension has an interior end, wherein the interior ends of the first set of stator conductor extensions abut the interior ends of the second set of stator conductor extensions at an abutting junction, wherein, in the first position, magnetic flux is conducted across the abutting junction in a first direction, and wherein, in the second position, magnetic flux is conducted across the abutting junction in a second direction.

16. The method of claim 14, wherein each of the first set of rotor extensions has a first surface and a second surface, the first surface and the second surface disposed on opposing sides of the rotor extension, wherein, in the first position, flux is transferred from each of the first set of rotor extensions to one of the first set of stator extensions via the respective first surfaces, and wherein, in the second position, flux is transferred from each of the first set of rotor extensions to one of the second set of stator extensions via the respective second surfaces.

17. The method of claim 14, further comprising varying, during the rotating the rotor assembly, a current input to one of a stator coil or a rotor coil in order to vary the current output by the other coil.

18. The method of claim 14, further comprising varying, during the rotating the rotor assembly, a distance in the axial direction between the rotor assembly and the stator assembly in order to vary the current output by a coil of the electrical machine.

19. The method of claim 14, wherein in the first position, flux is conducted around a first coil of the electrical machine in a substantially clockwise direction, wherein, in the first position, flux is conducted around a second coil of the electrical machine in a substantially counterclockwise direction, wherein, in the second position, flux is conducted around the first coil in a substantially counterclockwise direction, and wherein, in the second position, flux is conducted around the second coil in a substantially clockwise direction.

\* \* \* \* \*